United States Patent
Mansour et al.

(10) Patent No.: US 11,087,441 B1
(45) Date of Patent: Aug. 10, 2021

(54) IMAGE RECONSTRUCTION USING ARTIFICIAL INTELLIGENCE (AI) MODULES AGNOSTIC TO IMAGE ACQUISITION SETTINGS

(71) Applicant: Mitsubishi Electric Research Laboratories, Inc., Cambridge, MA (US)

(72) Inventors: Hassan Mansour, Cambridge, MA (US); Petros Boufounos, Winchester, MA (US); Abdullah Al-Shabili, New York, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 10 days.

(21) Appl. No.: 16/776,538

(22) Filed: Jan. 30, 2020

(51) Int. Cl.
*G06K 9/00* (2006.01)
*G06T 5/00* (2006.01)

(52) U.S. Cl.
CPC ............ *G06T 5/002* (2013.01); *G06T 5/003* (2013.01); *G06T 2207/20081* (2013.01); *G06T 2207/20084* (2013.01); *G06T 2207/20182* (2013.01)

(58) Field of Classification Search
CPC .............. G06T 5/002; G06T 5/003; G06T 2207/20081; G06T 2207/20084; G06T 2207/20182
USPC ........................................................ 382/157
See application file for complete search history.

(56) References Cited

U.S. PATENT DOCUMENTS

| 10,297,049 | B2 * | 5/2019 | Koehler ................. G06T 11/008 |
| 10,657,446 | B2 * | 5/2020 | Kamilov ............... G06T 11/003 |
| 10,755,395 | B2 * | 8/2020 | Yu ........................ G06K 9/6247 |
| 2018/0349771 | A1 * | 12/2018 | Kamilov ............... G06T 11/003 |

OTHER PUBLICATIONS

Gholami, Ali, and S. Mohammad Hosseini. "A general framework for sparsity-based denoising and inversion." IEEE transactions on signal processing 59.11 (2011): 5202-5211. (Year: 2011).*

* cited by examiner

*Primary Examiner* — Jonathan S Lee
(74) *Attorney, Agent, or Firm* — Gennadiy Vinokur; Hironori Tsukamoto

(57) ABSTRACT

An image processing system for determining an image of a scene using AI modules that are agnostic to image acquisition settings. The system comprises a processor that executes an image acquisition settings estimator module to estimate a forward operator using setting data. Further, recursively estimates the image of the scene until a termination condition is met, where for a current iteration, the processor executes an image acquisition inverter module with the estimated forward operator and a previous estimate of the image of the scene estimated during a previous iteration to produce the current noisy image, executes a noise level estimator module with the previous estimate of the image to produce a current noise level, and executes a denoiser to remove the current noise level from the current noisy image to produce a current image.

15 Claims, 15 Drawing Sheets

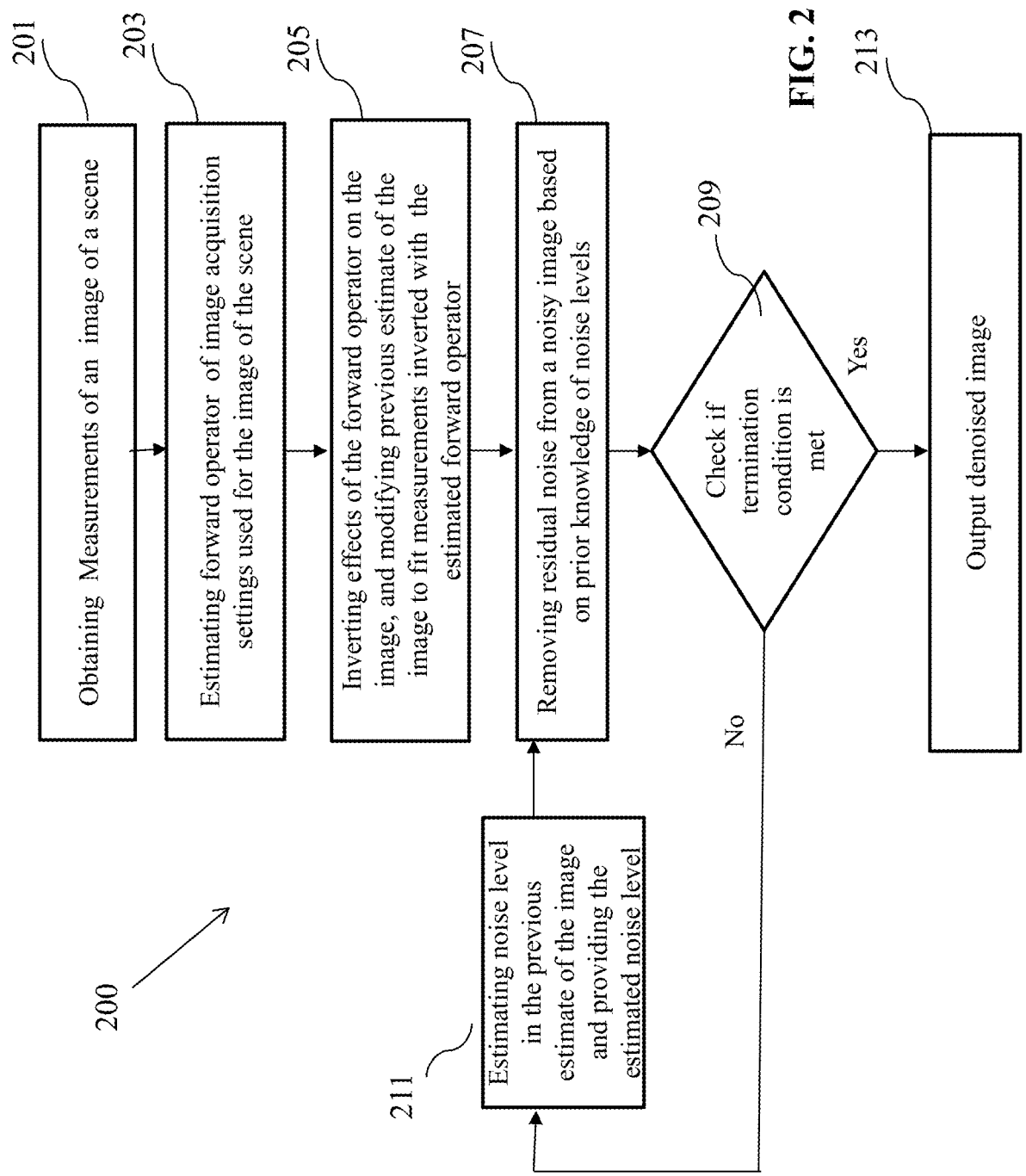

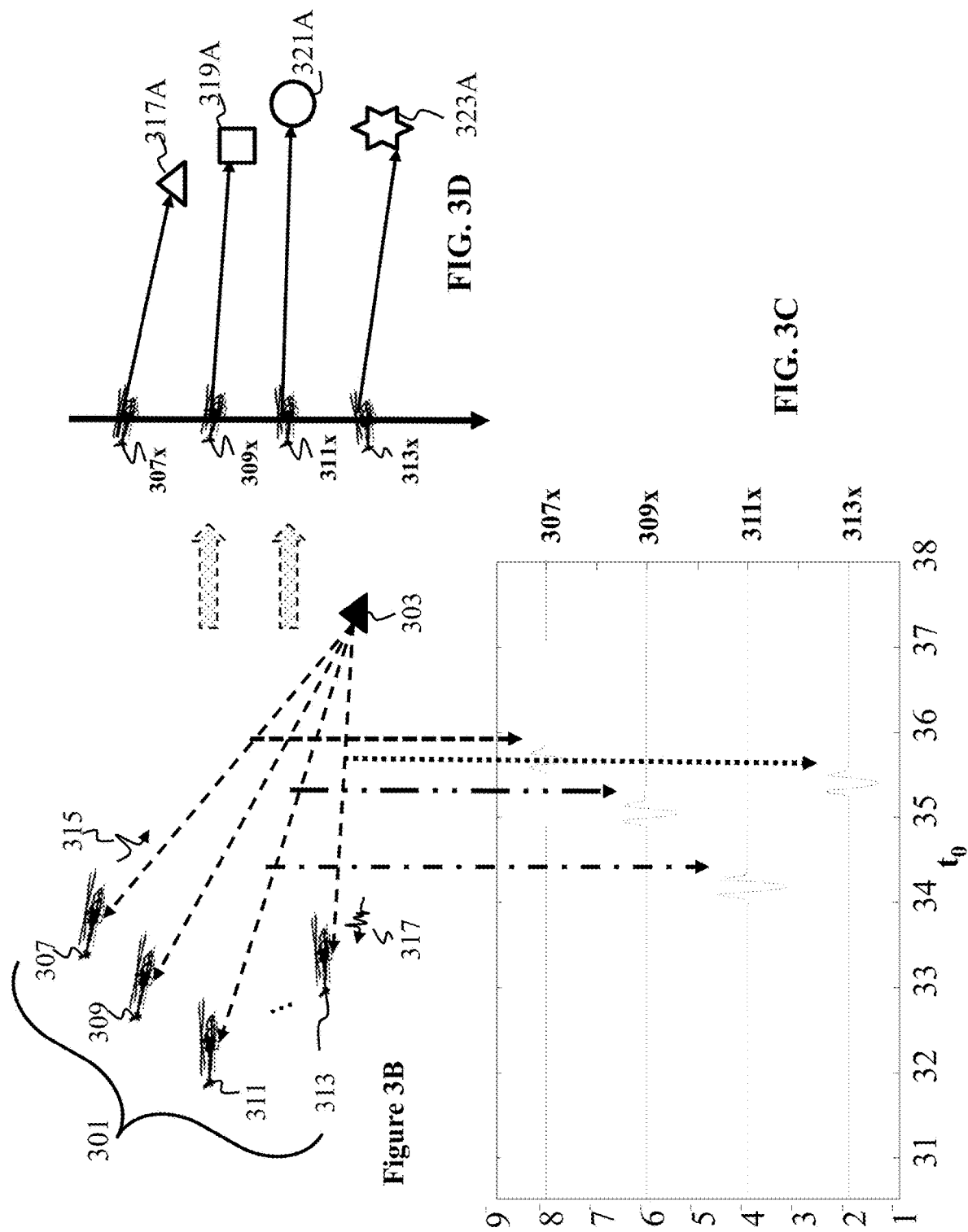

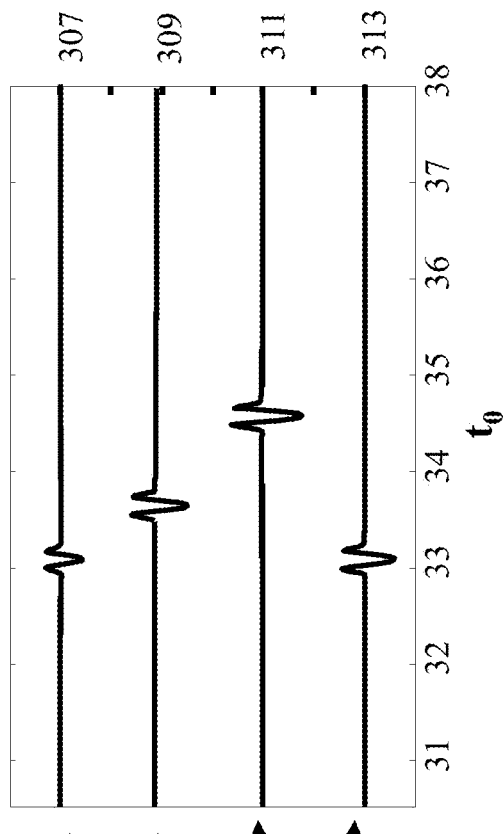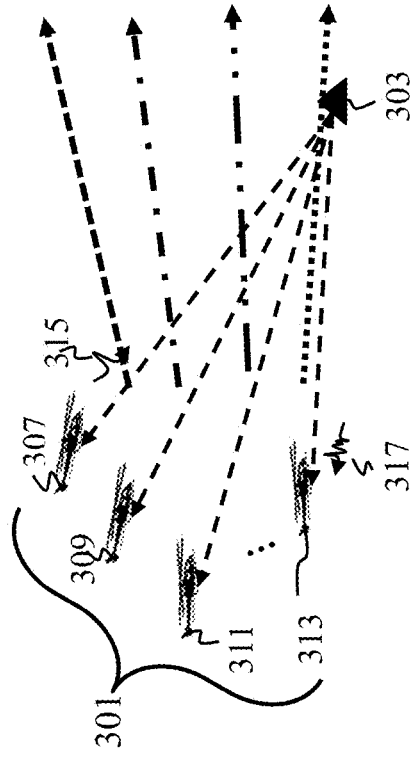
FIG. 5B
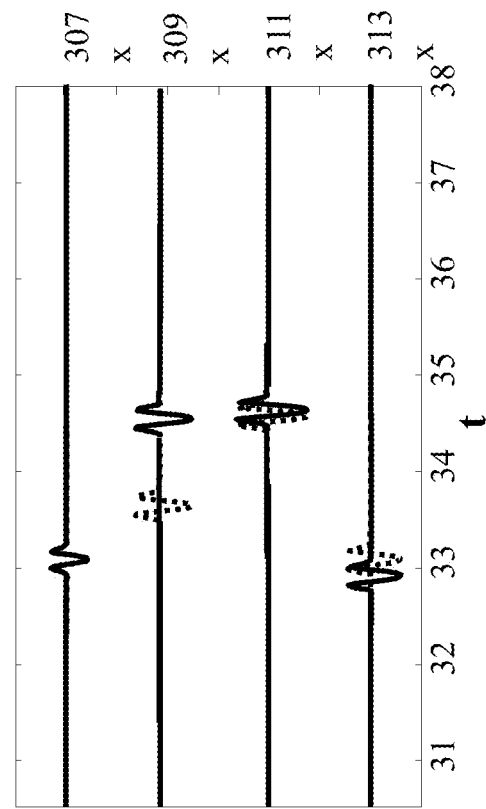
FIG. 5C

IMAGE RECONSTRUCTION USING ARTIFICIAL INTELLIGENCE (AI) MODULES AGNOSTIC TO IMAGE ACQUISITION SETTINGS

TECHNICAL FIELD

The present disclosure relates generally to image processing and more particularly to image reconstruction by solving a linear inverse problem using artificial intelligence (AI) modules agnostic to image acquisition settings.

BACKGROUND

An inverse problem is a process of calculating from a set of observations causal factors that produced them. It is called an inverse problem because it starts with the effects and then calculates their causes. It is the inverse of a forward problem, which starts with the causes and then calculates the effects.

A linear inverse problem can be described by the linear system of equation $$y = Ax + v, \tag{1}$$

in which a target signal (or image) $x \in \mathbb{R}^N$ is observed through a linear and often under-determined forward operator $A \in \mathbb{R}^{m \times N}$ to produce the measurements $y \in \mathbb{R}^m$. The forward operator A represents image acquisitions settings, such as type and mutual arrangement of the transmitters of signals to the scene and the receivers measuring the reflections of the signals from the scene, types and frequency of the signals, optics of the imaging equipment, or the like. The measurement noise, $v \in \mathbb{R}^m$, is often assumed to be independent Gaussian distributed. Given the measurements y and forward operator A, sometimes also called an observation matrix A, the task is to recover the target signal x by incorporating some prior knowledge on the structure of the class of signals being acquired. Consequently, established frameworks for tackling such problems set up the following optimization problem:

$$\min_x f(x) + \lambda \rho(x), \tag{2}$$

where $$f(x) := \frac{1}{2} \|y - Ax\|_2^2$$

is the objective function, $\rho(x)$ is regularizing penalty function—typically non-smooth—that restricts the space of solutions to the appropriate class of signals x, and $\lambda$ is the regularization parameter controlling the trade-off.

Conventional signal processing methods explicitly model the regularizer $\rho(x)$ and have derived efficient algorithms for solving (2). One of the most computationally efficient and effective iterative methods is the proximal gradient descent (PGD) method that splits the update in each iteration t into the following two steps:

$$z^{t+1} = x^t - \alpha^t A^T (Ax - y) \tag{3}$$

$$x^{t+1} = \arg\min_u \frac{1}{2} \|u - z^{t+1}\|_2^2 + \alpha^t \lambda p(u) \tag{4}$$

The first step is a gradient descent update with respect to the objective function $f(\cdot)$ using the step size $\alpha^t$, while the second step computes a proximal mapping with respect to the penalty function. However, in some applications, the penalty function $\rho(\cdot)$ may be difficult to determine or describe analytically, but examples of the class of signals x may be readily available.

Recent work has demonstrated that deep learning can be effective in solving linear inverse problems. This success is due to the ability of deep network architectures to provide nonlinear and differentiable models for classes of signals that are not well-characterized using conventional signal models, such as subspace, manifold, or sparse models.

However, the deep learning methods show good performance only in controlled environment, where image acquisition settings and noise level are known in advance to train a neural network. For example, many neural network architectures have been proposed as Gaussian denoisers of natural images. For example, denoising convolutional neural network (DnCNN) uses 17 layers with a residual connection, multi-level wavelet convolution neural network (MWCNN) uses a modified U-Net architecture and wavelet transform concepts, and residual encoder-decoder network (RED-Net) that uses encoder-decoder with symmetric skip connections. Despite their promising performance, these approaches are not applicable if the noise distribution and variance differs from that of the training dataset. In addition, when forward operator varies due to variations of the image acquisition settings, the application of end-to-end trained neural network for solving linear inverse problem becomes impractical.

Accordingly, there is a need for a system and a method for solving linear inverse problem using artificial intelligence (AI) modules agnostic to image acquisition settings.

SUMMARY

It is an object of some embodiments to provide a system and a method for solving the linear inverse problem using the artificial intelligence (AI) modules agnostic to image acquisition settings. Such a system is advantageous for image acquisition applications under uncontrolled image acquisition settings, which are frequent in applications with moving image sensors.

Some embodiments are based on recognition that measurements of an image of a scene are acquired according to image acquisition settings subject to noise. The image acquisition settings can be represented by a forward operator capturing specifics of the image acquisition, such as type and mutual arrangement of imaging equipment transmitting and receiving reflection of transmitted signals from one or more targets in the scene, type and frequency of the signals, optics of the imaging equipment, and motion of the imaging equipment. The image acquisition settings can vary before and during the imaging process. For example, mutual arrangement of a transmitter and a receiver of imaging equipment can change between the consecutive image frames due to motion of the transmitter and/or the receiver. Even in situations when transmitters and receivers are collocated or rigidly attached to each other, the change of motion of the imaging system modifies the blur component of image acquisition settings. In these situations, the forward operator needs to be dynamically and adaptively estimated in real time to reflect the change in the image acquisition settings.

On the other hand, capacity to remove the noise corrupting the measurements should be independent from the image acquisition settings. For example, the noise can be considered Gaussian and the level of the noise is a function of the image itself, rather than the image acquisition settings. This is because different image acquisition settings introduce different levels of noise with different distributions. However, after removing the effect of the acquisition forward operator, the residual noise exists in the image space and a suitable denoiser must be able to handle image domain noise. To that end, the noise can be considered as additive noise on an image approximating inversion of effect of the forward operator (or, equivalently, inversion of image acquisition settings) on the measurements.

Some embodiments are based on realization that image reconstruction can be represented as a combination of modules that are dependent or independent from the image acquisition. The image acquisition dependent module inverts effects of image acquisition settings on the measurements. Result of such inversion is a noisy image. The image acquisition independent module removes additive noise from the image after the effects of the image acquisition settings are inverted.

Some embodiments are based on recognition that the image acquisition dependent module, such as image acquisition inverter that inverts the effect of the forward operator on image acquisition, can be implemented as a solver or as a learner if necessary. However, advantageously, the image acquisition independent process can be implemented as learners, i.e., artificial intelligence (AI) modules, such as neural network that can be agnostic to image acquisition settings. An example, of such an AI module is a denoiser that can be trained on noisy images rather than on the measurements.

However, some embodiments are based on recognition that for the image denoiser to work properly, the denoiser needs to be trained for specific level of noise, which may be computationally impractical for image acquisition applications with uncontrolled image acquisition settings and thus varying noise. The uncontrolled image acquisition may occur in an uncontrolled environment, where image processing system is in motion. For example, camera motion or at least one of the image capturing sensors or a target, itself, is moving. To address this issue, some embodiments implement the denoiser as a neural network accepting a noise level as an input. Examples of such a neural network include FFDNet architecture, and a U-net architecture with a noise level input channel Some embodiments are based on the recognition that the FFDNet based denoiser simplifies denoising for image acquisition applications with uncontrolled image acquisition settings and makes the denoiser adaptable for different noise levels. However, such architecture creates a need to provide the noise level for the noisy image as an input to the denoiser. To that end, it is an object of some embodiments to provide an AI module trained to estimate a noise level to be served as an input to the noise adaptable denoiser.

Some embodiments are based on recognition that the noise level can be estimated from the measurements themselves. However, measurements are dependent on the image acquisition settings and thus such an implementation of AI module would not be agnostic to the image acquisition. Some embodiments are based on recognition that the noise level can be estimated from the noisy image produced by the image acquisition inverter. Indeed, such an implementation would make a noise level estimator agnostic to the image acquisition settings. However, this solution is problematic because noise in the noisy images estimated by the image acquisition can be contaminated by the null space of the forward operator A as a result of the acquisition inverter, where the null space of an operator is the set of all noise components that result in zero measurement energy after going through the forward operator A. Consequently, the null space of the forward operator A can contribute noise components into an image domain.

Some embodiments, however, are based on another realization that the image acquisition inverter and the denoiser need to work cooperatively and recursively to recover the image. This is because, in the image acquisition application with uncontrolled image acquisition settings, it is problematic to completely invert the effects of image acquisition settings without considering the noise, but the noise is removed after the inversion. To that end, it is advantageous to implement the image acquisition invertor and the denoiser as the recursive pair, in which the noisy image outputted by the inverter is an input to the denoiser, while the output of the denoiser is an input to the inverter together with the measurements during the next iteration.

As an additional advantage of such a recursion, the output of the denoiser of the previous iteration, i.e., a previous image estimation, can be an input to the noise level estimator during the current iteration. This is because the inverter inverts the measurements based on the image determined during the previous iteration as a guidance. That previous image includes noise. The inverter does not deal with the noise, thus, it is reasonable to assume that the noisy image produced by the inverter has the same level of noise as the previous image. In addition, since every iteration utilizes the denoiser to remove the noise from the null space of the forward operator, the amount of noise contributed from the null space of A diminishes as the image passes through additional iterations.

In such a manner, the noise level estimator can be trained on images, not measurements, which makes it agnostic to image acquisition. The input to the noise level estimator is denoised image of previous iteration, and the output is the noise level for denoising the noisy image in the current iteration.

Accordingly, one embodiment discloses an image processing system for determining an image of a scene, the image processing system comprising: an input interface configured to accept measurements of the scene acquired under image acquisition settings and settings data indicative of the image acquisition settings; a memory configured to store instructions implementing modules of the system, the modules comprising: an image acquisition settings estimator module configured to estimate a forward operator of the image acquisition settings based on the settings data; an image acquisition inverter module configured to modify a previous estimate of the image of the scene to fit the measurements inverted with the forward operator to produce a current noisy image of the scene; a denoiser module configured to remove noise from a noisy image provided to the denoiser module subject to a known noise level; a noise level estimator module configured to estimate a noise level in an input image provided to the noise level estimator module. The image processing system further comprises a processor coupled with the memory and configured to: execute the image acquisition settings estimator module to estimate the forward operator using the setting data; and recursively estimate the image of the scene until a termination condition is met, where for a current iteration, the processor (1) executes the image acquisition inverter module with the estimated forward operator and the previous estimate of the image of the scene estimated during a previous iteration to produce the current noisy image; (2) executes the noise level estimator module with the previous estimate of the image to produce a current noise level; and (3) executes the denoiser to remove the current noise level from the current noisy image to produce a current image. The image processing system further comprises an output interface configured to output the image of the scene.

In some embodiments, the image acquisition inverter module is a solver configured to modify the previous estimate of the image of the scene by adding a scaled gradient update of a distance function. The distance function quantifies error between the measurements of the image and synthesized measurements of the image. The synthesized measurements are obtained by multiplying the forward operator and the previous estimate of the scene.

In some embodiment the image acquisition settings estimator module is further configured to estimate a blur kernel resulting from an out of focus acquisition or a motion of a camera that acquires the image of the scene.

In some embodiments, the image acquisition settings estimator module is in communication with a set of transmitters and a set of receivers. The image acquisition settings estimator module is further configured to estimate a correction of a position of at least one receiver, from the set of receivers, receiving antenna that collects radar measurements of a pulse that is transmitted from at least one transmitter, of the set of transmitters, transmitting antenna and reflected from one or several targets in the scene.

In some embodiments, the image acquisition settings estimator module is further configured to estimate a correction to a reference illuminating pulse that is transmitted from at least one transmitter of the set of transmitters but that would have been distorted during the transmission due to equipment errors.

In some example embodiments, the denoiser module is at least one of an FFDNet neural network or a U-Net neural network. The denoiser module is trained on noisy images with different levels of noise.

In some embodiments, the noise level estimator module is a convolutional neural network trained with the pretrained denoiser module.

Another embodiment discloses a method for determining an image of a scene, where the method uses a processor coupled with stored instructions implementing the method, where the instructions, when executed by the processor carry out steps of the method, comprising: accepting, by an input interface, measurements of the image of the scene acquired under image acquisition settings, and settings data indicative of the image acquisition settings; estimating, by an image acquisition setting estimator module, forward operator of the image acquisition settings based on the settings data; modifying, by the image acquisition inverter module, a previous estimate of the image of the scene to fit the measurements inverted with the estimated forward operator to produce a current noisy image of the scene; removing, by the denoiser module, noise from a noisy image provided to the denoiser module subject to a known noise level; estimating, by the noise level estimator (NLE) module, noise level present in an input image provided to the NLE module.

The method further comprising recursively estimating the image of the scene until a termination condition is met, wherein for a current iteration: (1) executing the image acquisition inverter module with the estimated forward operator and the previous estimate of the image of the scene estimated during a previous iteration to produce the current noisy image (2) executing the noise level estimator module with the previous estimate of the image to produce a current noise level; and (3) executing the denoiser to remove the current noise level from the current noisy image to produce a current image; and outputting, by an output interface, the image of the scene.

In some embodiments modifying the previous estimate of the image of the scene comprises modifying the previous estimate of the image by adding a scaled gradient update of a distance function.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2 illustrates steps of a method implemented for determining the image of the scene, according to some embodiments of the present disclosure.

FIG. 3B and FIG. 3C in conjunction illustrate distortion that affects the measured time domain signal of each antenna due to error in receiver position, when measuring the reflection of a single target, according to example embodiments of the present disclosure.

FIG. 3D is a schematic illustrating the mapping between a set of antennas having perturbed positions and measuring the reflection of a single target to a set of antennas having uniform linear positions and measuring shifted versions of the same target from FIG. 3B and FIG. 3C, according to example embodiments of the present disclosure.

FIG. 5B and FIG. 5C in conjunction illustrate distortion that affects the measured time domain signal of each antenna due to the error in each radar clock, when measuring the reflection of a single target, according to an example embodiment.

Figure 1A:
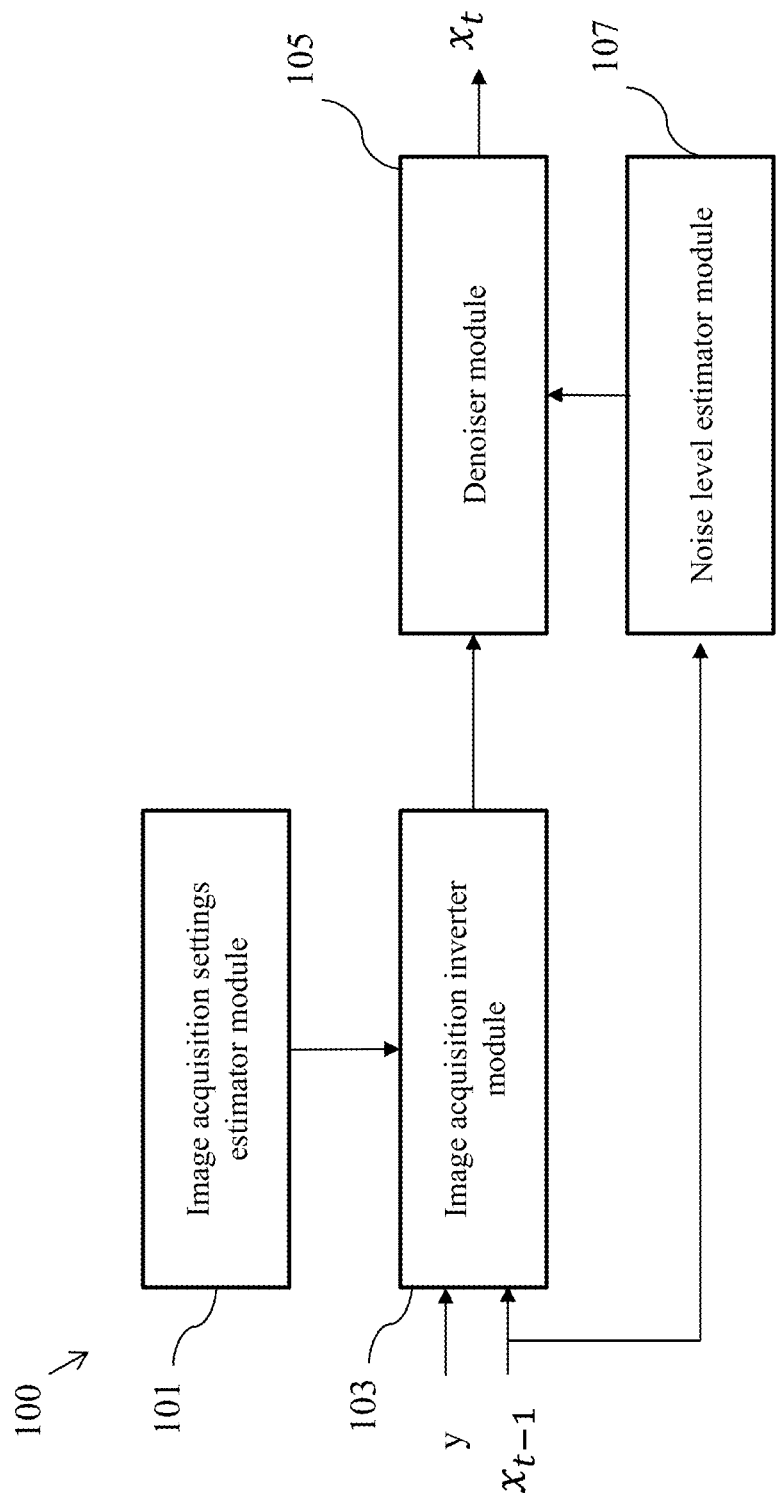
FIG. 1A illustrates a schematic of an image processing system configured for determining an image of a scene, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Currently, denoisers are implemented using a deep neural network (DNN) in an image processing system to effectively solve the linear inverse problem while determining an image. The DNN network can be trained for different linear forward operator A indicative of the image acquisition settings and additive noise. The DNN network can be trained in a controlled environment, where the linear forward operator A and additive noise v are known. However, in real life applications there exist an uncontrolled environment, where the linear forward operator A of the image acquisition settings and the noise v are variable and not known in priori. For example, in the uncontrolled environment when a camera, capturing an image of a scene, is in motion, the image acquisition parameter will change, which consequently changes A. Therefore, if the DNN based denoiser is trained for specific levels of A, then if A changes the DNN based denoiser trained for the specific levels of A also required to be changed. In other words, once the DNN based denoiser is trained on a certain image acquisition settings and noise level, it becomes a black box, and strength of the DNN based denoiser can't be controlled. Therefore, the conventional algorithms used for training the denoiser have a fundamental generalization issue as the current DNN based denoiser (or AI denoiser) are dependent on image acquisition settings and additive noise. Hence, it is difficult to determine the image in the uncontrolled environment with current DNN based denoisers.

To address this issue, the present disclosure proposes an image processing system that reconstructs an image agnostically (or independently) to the image acquisition settings. The image processing system uses a number of components for image reconstruction, for example an image acquisition inverter and artificial intelligence (AI) modules. The AI modules may be implemented using deep neural network. In some embodiments, the AI modules comprises a denoiser module and a residual noise level estimator (NLE) module. According to the present disclosure, the image acquisition inverter and the AI modules are decoupled. These components are decoupled by training the AI modules on previous estimate of an image to be reconstructed, instead of training the AI modules on a noisy image produced by the inverter. This previous estimate of the image to be reconstructed is an output of the denoiser in previous iteration. Such type of decoupling makes the AI modules agnostic to image acquisition settings. Further, the inverter and the AI modules are connected to form a recursive pair by providing the output of the denoiser (i.e. the previous estimate of the image to be reconstructed) to the inverter. The inverter works in cooperation with the AI modules by using the previous estimate of the image to invert effects of the linear forward parameter indicative of the image acquisition settings used for the image. In this way, the image reconstruction by the AI modules is agnostic to the image acquisition settings. Hence, the image processing system with such AI modules can be used for image reconstruction even in environments (also known as "uncontrolled environments") where the image acquisition settings can't be controlled.

In some embodiments, the AI modules comprises the NLE module and the denoiser module. The NLE estimates noise level from a previous estimate of the image of the scene and feeds the estimated noise level to the denoiser. The denoiser uses the input noise levels to estimate the current image. In this way, the denoiser and the NLE are trained on noisy images rather than on the measurements of those images. This makes the denoiser and the NLE agnostic to the image acquisition settings and hence can be used in the uncontrolled environment to reconstruct or determine the image of the scene effectively. Detailed analysis of the implementation of the proposed image processing system is described with reference to FIGS. 1A and 1B.

In some of the embodiments, Plug-and-play (PnP) denoising is used for solving the inverse problems. The PnP denoising is a non-convex framework that integrates modern denoising into Alternating Direction Method of Multipliers (ADMM) or other proximal algorithms. The performance improvement of PnP denoising depends on carefully choosing noise levels of a Gaussian denoiser (for example a fast and flexible denoising convolutional neural network (FFDNet)) and a descent step size in every iteration. Further, the proposed disclosure uses an unfolded proximal quasi-Newton (PQN) algorithm for training the Gaussian denoiser. In the proximal quasi-Newton algorithm, an input signal to the denoiser is estimated in every iteration and at every entry of the signal. Further, another convolution network (CNN) is deployed with the denoiser in order to estimate an element-wise noise level, mimicking a diagonal approximation of Hessian matrix in quasi-Newton methods. Implementation of the proposed scheme for image determination is explained in detail below in conjunction with FIGS. 1A and 1B.

FIG. 1A illustrates a schematic of an image processing system configured for determining an image of a scene, according to some embodiments of the present disclosure. The image processing system 100 comprises an input interface (not shown in FIG. 1A) an image acquisition settings estimator module (101), an image acquisition inverter module (103), a denoiser module (105), a residual noise level estimator (NLE) module (107), and an output interface (not shown in FIG. 1A). The input interface is configured to obtain measurements y of the image x of the scene that is acquired under image acquisition settings, and settings data indicative of the image acquisition settings. The image of the scene may be a two dimensional image or a three dimensional image.

Image Acquisition Settings Estimator Module:

The image acquisition settings estimator module 101 is configured to estimate a linear forward operator A (or forward operator) of the image acquisition settings based on the settings data. The image acquisition settings are represented by A. Further, the image acquisition settings estimator module 101 is configured to dynamically estimate the linear forward operator. The image acquisition settings may change during capturing of the image due to number of reasons (such as motion of camera) and consequently changing the linear forward operator A. For example, motion of camera capturing a 3D image of a scene, an out of focus acquisition of the image, or the likes. The relative motion between the camera and the scene produces a motion blur. The motion blur in images is an undesirable effect in various computer vision algorithms. In particular, the motion blur is a critical issue in the correspondence problem because motion blur destroys the structure details of images and degrades resolution of the image in a blurred direction.

For example, in an example embodiment, the image acquisition setting estimator module 101 is configured to estimate a blur kernel resulting from an out of focus acquisition or a motion of a camera. The image acquisition settings estimator module 101 utilizes a pixel correspondence that is obtained by considering the effect of the motion blur. The image acquisition settings estimator module 101 may parameterize blurred appearance of the 3D image with scene depth for given camera motion and accurately estimates the depth map based on blur-considered pixel correspondence. The estimated depth is then converted into pixel-wise blur kernels, and non-uniform motion blur is easily removed. The obtained blur kernel is depth-dependent, thus it effectively addresses scene-depth variation due to an out of focus acquisition or a motion of a camera.

Another example of the uncontrolled environment includes a distributed array imaging system, where the image acquisition settings estimator is in communication with a set of transmitters and receivers. At least one transmitter of the set of transmitters may transmit a pulse to at least one target in a region of interest (ROI), and at least one receiver from the set of receivers receives the reflected pulse from the at least one target, and the image acquisition settings estimator module 101 of the at least one receiver reconstructs an image of the at least one target based on the received pulse. A fundamental challenge that arises in the distributed array imaging system comes from an uncertainty in exact positions of antennas, for example receivers. To that end, the image acquisition settings estimator module 101 is configured to estimate a correction of a position of at least one receiver, from the set of receivers, that collects measurements of a pulse that is transmitted from the at least one transmitter, of the set of transmitters, and reflected from one or several targets in the scene (ROI).

Another fundamental challenge that arises in distributed array imaging comes from uncertainty in clock of the receivers. To that end, the image acquisition setting estimator module 101 is configured to estimate a correction in the clock of at least one receiver from the set of receivers that collects radar measurements of a pulse that is transmitted from at least one transmitter of the set of transmitters and reflected from one or several targets in the scene (ROI).

Further, the image processing system 100 comprises modules for reconstruction of the image x. These modules comprise the image acquisition dependent module (inverter) and the image acquisition independent module (denoiser). These modules are implemented jointly to recursively estimate the image of the scene until a termination condition is met. The termination condition may be based on a level of noise present in an output image at the end of each iteration. The image acquisition dependent module implemented as the image acquisition inverter module 103 is explained in detail below with reference to FIG. 1A.

Image Acquisition Inverter Module:

In some embodiments, the image acquisition inverter module 103 is implemented as a solver. Additionally, or alternatively, in some embodiments, the image acquisition inverter module 103 is implemented as a learner, e.g., a trained neural network. The image acquisition inverter module 103 receives linear forward operator A that is indicative of the image acquisition settings, and a previous estimate $x_{t-1}$ of the image $x_t$ of the scene. The previous estimate $x_{t-1}$ of the image $x_t$ may be obtained directly from the denoiser module 105. In another embodiment, the previous $x_{t-1}$ estimate of the image $x_t$ may be obtained from a memory, where the previous estimate $x_{t-1}$ of the image $x_t$ may be stored by the image processing system 100. The image acquisition inverter module 103 inverts effects of image acquisition settings A (i.e. effects of the forward operator) on the image measurements y. Further, the image acquisition inverter module 103 is configured to modify the previous estimate $x_{t-1}$ of the image of the scene $x_t$ to fit the measurements inverted with the forward operator A to produce a current image z of the scene. The result of such inversion is a noisy image z. Operation of the image acquisition inverter module 103 is further explained below with reference to FIG. 1B.

Figure 1B:
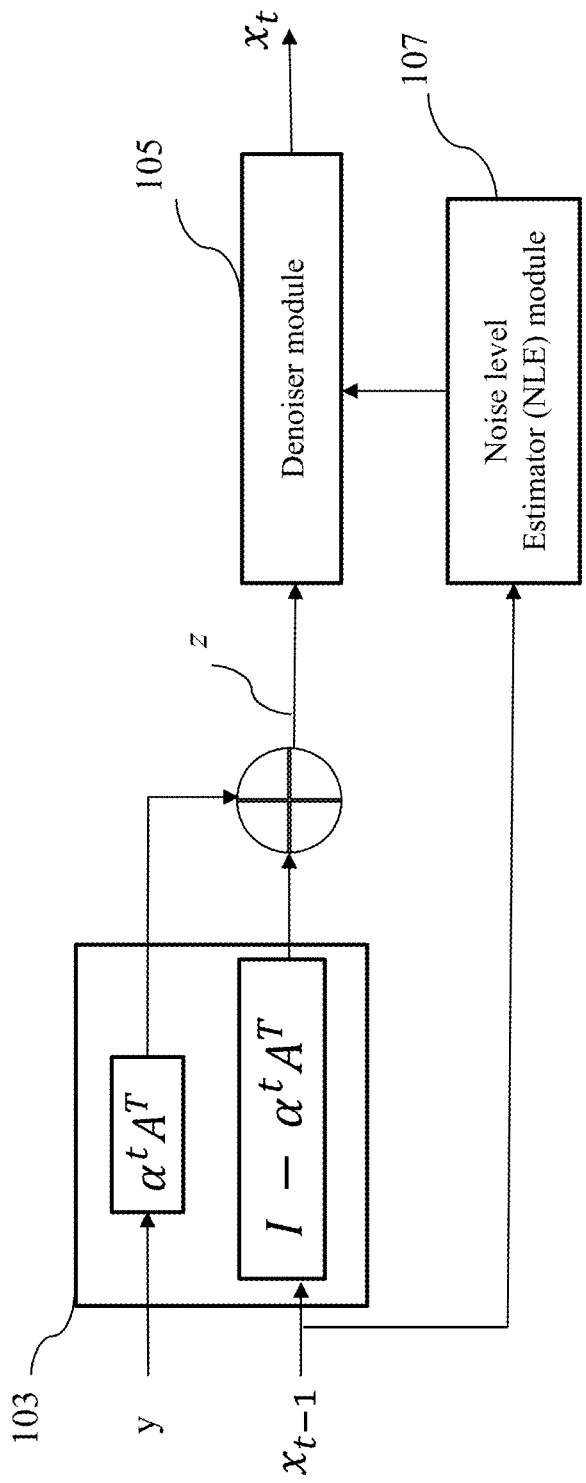
FIG. 1B illustrates a block diagram of one iteration of the proposed proximal-quais Newton method (PQNM) algorithm, according to some embodiments of the present disclosure.

FIG. 1B illustrates a block diagram of one iteration of the proposed proximal-quasi-Newton method (PQNM) algorithm, according to some embodiments of the present disclosure. As can be observed from the FIG. 1B, the image acquisition inverter module 103 processes on the measurements y of the image $x_t$ of the scene and previous estimate $x_{t-1}$ of the image $x_t$ of the scene. The image acquisition inverter module 103 is configured to modify the previous estimate $x_{t-1}$ of the image $x_t$ of the scene by adding a scaled gradient update of a distance function. The distance function quantifies error between the measurements of the image and synthesized measurements of the image. The synthesized measurements are obtained by multiplying the forward operator and the previous estimate of the scene. The resulting noisy image can be represented in mathematical equation (5).

$$z = x_{t-1} - \alpha^t A^T A x_{t-1} + \alpha^t A^T y \qquad (5)$$

The equation (5) can be rewritten as $$z = x_{t-1} + \alpha^t (A^T y - A^T A x_{t-1})$$

$$z = x_{t-1} + \alpha^t D(y, x_{t-1}) \qquad (6)$$

In the equation (6) $\alpha^t$ is a step size and $D(y, x_{t-1})$ is the scaled gradient update of the distance function. The distance function is quantifying the error between the measurements of the image y and synthesized measurements of the image $Ax_{t-1}$. The output noisy image z now comprises additive noise v (not shown in equations (5) and (6)) which needs to be removed to determine the denoised image of the image $x_t$ of the scene.

To that end the image processing system 100 utilizes the AI modules. The AI modules comprise the denoiser module 105 and the NLE module 107.

AI Modules:

The denoiser module 105 removes residual noise from the received noisy image z to produce the best estimate of the image $x_t$. The denoiser may be implemented as a learner i.e. an artificial intelligence (AI) module and produces estimate of the image $x_t$ agnostic (or independent) to the image acquisition settings A. The denoiser module 105 can be trained for specific levels of noise. However, such a noise dependent training may be computationally impractical for various image acquisition applications with uncontrolled image acquisition settings and thus varying noise.

To address this issue, in some embodiments the denoiser is implemented as a neural network that accepts noise levels as input. Examples of such neural networks are FFDNet architecture and U-net architecture with a noise level input channel In one embodiment, the FFDNet architecture based denoiser is used. The FFDNet simplifies denoising for image acquisition applications with uncontrolled image acquisition settings and makes the denoiser adaptable for different noise levels. Thereby, removing the requirement of implementation of different denoisers or changing denoisers for different image acquisition settings and different noise levels. In order to provide the noise level for the noisy image as an input to the denoiser, it is an object of some embodiments to provide an AI module, referred as residual noise level estimator (NLE), trained to estimate a noise level to be served as an input to the noise adaptable denoiser module 105.

To that end, deep learning PnP denoising approach of some embodiments is equipped with a mechanism to estimate noise standard deviation at each of the N entries of the image $x_t$, and subsequently control the denoiser strength. The image $x_t$ is estimated recursively for T iterations until a termination condition is met. To that end, the FFDNet architecture of the PnP denoiser is utilized which accepts as input the noise standard deviation at every iteration. The FFDNet denoiser is re-trained by unfolding the proximal quasi-Newton (PQN) algorithm over T iterations. Further, the NLE is used to estimate the element-wise noise level affecting the iterates $x_t$ at every iteration $t \in \{1 \ldots T\}$. The NLE is implemented using convolutional neural network (CNN).

Further, the NLE module 107 is used at the input of the FFDNet denoiser module 105 to handle spatially varying noise that arises from the contribution of a null space of A. The FFDNet denoiser 105 behaves as a diagonal Hessian estimator $\hat{H}(x_t)$ and determines the element-wise noise standard deviation affecting the entries of $x_t$. Further, the CNN of the NLE module 107 is formed from two 2-D convolution layers with 24 filters in each layer of size 3×3, and a ReLU activation function. The output of the NLE module 107 produces the noise standard deviation input layer of the FFDNet denoiser 105. By unfolding the proximal quasi-Newton method (PQNM) over T iterations, a learned PQNM is developed, where each iteration is composed of the following update equations:

$$z_{t+1} = x_t - \alpha^t A^T (A x_t + y) \qquad (7)$$

$$x_{t+1} = \text{FFDNet}(z_{t+1}, \lambda \alpha^t \hat{H}(x_t)) \qquad (8)$$

It can be observed that in equation (7) the inverse of the approximate Hessian component $[\hat{H}(x_t)]^{-1}$ is missing. This is due to a numerical instability that is observed during the training phase. This numerical instability prevents the training from converging. A block diagram of one iteration of the proposed PQNM is presented in FIG. 1B. The NLE module 107 represents a mini-CNN that is shared with all the iterations. The task of this network is to process a noisy image and output the estimated noise level in the range of $[0, 1/(\lambda \alpha^t)]$.

T unfolded iterations of a simplified PQNM-PnP is denoted by $\mathcal{T}_{H_\Theta}^N (\cdot)$, where $H_\Theta$ represents the NLE networks parameters. Therefore, the overall optimization problem can be formulated as $$\hat{\Theta} = \arg\min_\theta \sum_{i=1}^M \left\| x_i - \mathcal{T}_{H_\Theta}^N (y_i) \right\|^2 \qquad (9)$$

$$\text{s.t. } 0 \leq NN_{H_\Theta}(y_i) \leq \frac{1}{\lambda \alpha^t} \quad \forall i = 1, \ldots, M$$

in order to simplify the training process, the box constraint is embedded into the model architecture by adding a clipping layer.

Training of AI Modules:

In some embodiments, for the training of the denoiser module 105, the training dataset composed of pairs of input-output patches $\{((\tilde{I}_j, M_j), I_1)\}_{j=0}^m$ which are generated by adding additive white Gaussian (AWG) with standard deviation $\sigma \in [0, 75]$ to the clean patches $I_j$ and building the corresponding noise map $M_j$ (which is in this case constant with all its elements equal to $\sigma$). A total of m=128×8000 patches are extracted from the Waterloo Exploration Database, where the mini-batch size is 128. The patch size is 64×64 and 50×50 for grayscale and color images, respectively. Patches are randomly cropped from randomly sampled images of the training dataset. Data is augmented five times by introducing rescaling by different scale factors and random flips. In cases where residual learning is used, the NLE network outputs an estimation of the input noise.

$$F(\tilde{I}) = \hat{N} \qquad (10)$$

Then, the denoised image is computed by subtracting the output noise to the noisy input.

$$\hat{I} = \tilde{I} - F(\tilde{I}) \qquad (11)$$

In this case, the loss function is the following $$L_{res}(\theta) = \frac{1}{2m} \sum_{j=1}^m \left\| F((\tilde{I}_j, M_j); \theta) - N_j \right\|^2 \qquad (12)$$

where $\theta$ is the collection of all learnable parameters.

On the other hand, models without residual learning estimate the denoised image directly, i.e.

$$F(\tilde{I}) = \hat{I} \quad (13)$$

resulting in the following loss function $$L_{no-res}(\theta) = \frac{1}{2m} \sum_{j=1}^{m} \left\| F((\tilde{I}_j, M_j); \theta) - I_j \right\|^2 \quad (14)$$

In all cases, adaptive moment estimation algorithm (ADAM) is applied to minimize the loss function, with all its hyperparameters set to their default values. The number of epochs is set to 80. The scheduling of the learning rate is also common to all cases. It starts at 1 e−3 for the first 50 epochs, then changes to 1e−4 for the following 10 epochs, and finally switches to 1e−6 for the remaining of the training.

During training, after the number of epochs surpasses the first milestone, the learning rate is divided by 10, and is divided again by 100 after the second milestone is surpassed. The actual values of these parameters have been chosen heuristically after observing the loss graphs of several trainings. In other words, learning rate step decay is used in conjunction with ADAM. Further, during the unfolded training stage, the assumption of a known noise level will be dropped and the NLE module 107 (mini-CNN) will be used to estimate this noise level input layer.

Unfolded Training of PQNM-PnP

In one implementation, after the PQNM-PnP algorithm is unfolded over T iterations (for example T=10), the NLE module 107 is trained along with fine tuning of the last 3 layers of the FFDNet denoiser module 105. The goal of this fine tuning is to be able to adapt the FFDNet denoiser module 105 to handle the changing distribution of the noise that arises from the null space of the forward operator A in each iteration. For comparing the performance of the proposed invention to a benchmark end-to-end learned AI system, the PQNM is retrained for single iteration with all the layers retrained except the first 2 convolution layers. In both of the scenarios, the simulation settings are as the following: 100,000 patches of size 128×128 from the Waterloo Exploration Database are extracted. Motion blur kernels are generated by uniformly sampling 6 angles in [0; π] and 6 lengths in a range of [5, 15] with a 15×15 size kernels. After convolving an image with each kernel, Gaussian noise of variance 0.01 is added to the blurry images. The step size parameter of each iteration, $\alpha^t$, is a learnable parameter. The training is performed using the ADAM solver, with an initial learning rate of $10^{-4}$. For the validation dataset, the Kodak24 dataset is used. The ADAM learning rate is decayed by a factor of 0.1 after two epochs of non-increasing average PSNR of the validation dataset, i.e. when the training reaches a plateau phase. The model is trained for 50 epochs.

Evaluation

Different embodiments use different data sets to evaluate the performance of the PQNM algorithm used in the proposed image processing system 100. The different data sets may comprise CBSD68, Set5, Set14, and the likes. In one of the PGD methods, the Gaussian pre-trained FFDNet denoiser is kept fixed and the true noise standard deviation is given to the denoiser in every iteration. The other method uses a fine tuned FFDNet denoiser where the last 3 layers are updated along with the true noise standard deviation. The proposed image processing system using the PQNM achieves the highest PSNR and SSIM. Moreover, the proposed PQNM outperforms the single iteration end-to-end learning approach with FFDNet by a consistent 1 dB in the average PSNR value.

In this way, training the AI modules on the noisy images rather than on the measurements makes the AI modules agnostic to the image acquisition settings. Further, in an embodiment the denoiser module 105 and the NLE module 107 may be trained separately. For example, in one embodiment, the denoiser module 105 is trained first separately and then the NLE module 107 is trained with the pre-trained denoiser module 105. Training the NLE module 107 jointly with the denoiser module 105 enables the denoiser module 105 to handle the changing distribution of the noise that arises from the null space of the forward operator A in each iteration.

Further, as observed in FIG. 1B, the image acquisition inverter module 103 may obtain the measurements y of the image x of the scene and previous estimate of the image $x_{t-1}$ and may map the measurement y to the space of the clean image x by first generating a noisy estimate $z = x_0 - \alpha^t A^T A x_0 + \alpha^t A^T y$. The learned denoiser module 105 may then attempt to remove the noise from the noisy estimate z in order to reconstruct the image $x_t$. However, this solution is problematic because noise in the noisy image z estimated by the image acquisition inverter module 103 can be contaminated by the null space of the forward operator A as a result of inversion of the image acquisition settings, where the null space of the operator are the set of all noise components that result in zero measurement energy after going through the forward operator A. Consequently, the null space of the forward operator A can contribute noise components into the image domain.

To address this issue the image acquisition inverter module 103 and the denoiser module 105 work cooperatively and recursively to recover the image $x_t$. This is because, in the image acquisition application with uncontrolled image acquisition settings, it is problematic to completely invert the effects of image acquisition settings without considering the noise, but the noise is removed after the inversion. To that end, the image acquisition inverter module 103 and the denoiser module 105 are implemented as a recursive pair, in which the noisy image z outputted by the inverter module 103 is an input to the denoiser module 105, while the output of the denoiser module 105 is an input to the inverter module 105 together with the measurements y during the next iteration. Further, the previous estimate $x_{t-1}$ of the image $x_t$, instead of the noisy image z at the output of the image acquisition inverter 103, is provided as input to the NLE module to estimate the noise level in the previous estimate $x_{t-1}$ of the image $x_t$. This makes NLE module 107 agnostic to the linear forward operator A indicative of the image acquisition settings. Further, it ensures that noise levels estimated by the NLE module 107 are accurate and are not affected by the null space of the forward operator A. These estimated noise levels are provided to the denoiser module 107.

Further, the denoiser module 105 receives the noisy image z from the image acquisition inverter module 103 and the estimated noise levels from the NLE module 107. The denoiser module 105 uses the correct noise levels to enhance the received noisy image z by removing residual noise from the noisy image z.

Thus, the iterative procedure ensures that the output of the denoiser module 105 of the previous iteration, i.e., a previous image $x_{t-1}$, can be an input to the noise level estimator module 107 during the current iteration. This is because the inverter inverts the measurements based on the image determined during the previous iteration as guidance. That previous image $x_{t-1}$ includes noise. The inverter does not deal with noise, thus, it is reasonable to assume that the noisy image produced by the inverter z has the same level of noise as the previous image $x_{t-1}$. In addition, since every iteration utilizes the denoiser module 105 to remove the noise from the null space of the forward operator, the amount of noise contributed from the null space of A diminishes as the image passes through additional iterations.

FIG. 2 illustrates steps of a method implemented for determining the image of the scene, according to some embodiments. At least one system 100 and method 200, can begin with step 201 that includes accepting, by the input interface of the image processing system 100, measurements of the image of the scene acquired under image acquisition settings, and settings data indicative of the image acquisition settings. The measurements of the image and the setting data of the image may be obtained wirelessly through a communication channel. At step 203, estimating, by the image acquisition setting estimator module, forward operator of image acquisition settings used for the image of the scene. The forward operator is estimated based on the settings data. At step 205, inverting, by the image acquisition inverter module 103, effects of the image acquisition settings i.e. effects of the forward operator A on the image measurements. Further, modifying, by the image acquisition inverter module 103, a previous estimate of the image to fit measurements inverted with the estimated forward operator to produce a current noisy image of the scene.

At step 207, removing, by the denoiser module, residual noise from a noisy image provided to the denoiser module subject to a known noise level. The noisy image is obtained from the image acquisition inverter module 103. Removing the residual noise may comprise removing an additive white Gaussian noise and noise affected by a null space of the forward operator A that changes distribution of the noise. At step 209, checking whether a termination condition has met. The termination condition may be based on level of noise present in the image at the output of the denoiser module 105. For example, if the noise level in the output image is within a certain threshold, then the recursive estimation of the image is terminated, and final image is provided as the output. If the termination condition is not met, then at step 211, estimating, by the NLE module 107, a noise level present in an input image provided to the NLE module 107, where the input image correspond to the previous estimate of that image. Further, providing, by the NLE module 107, the estimated noise level to the denoiser module 105. The step 211 is implemented by recursively estimating the image of the scene until the termination condition is met, wherein for a current iteration: (1) executing the image acquisition inverter module with the estimated forward operator and the previous estimate of the image of the scene estimated during the previous iteration to produce the current noisy image, (2) executing the noise level estimator module with the previous estimate of the image to produce a current noise level; and (3) executing the denoiser to remove the current noise level from the current noisy image to produce a current image. If the termination condition is met, then at step 213, outputting, by the output interface, the image of the scene. The output image is the final denoised image.

Further, an advantage of the proposed image processing system 100 is that it can be used for image reconstruction even in the uncontrolled environments. Implementation of the proposed system and method in an uncontrolled environment is explained in detail below with reference to exemplary scenario of the uncontrolled environment that is illustrated in FIG. 3A.

Figure 3A:
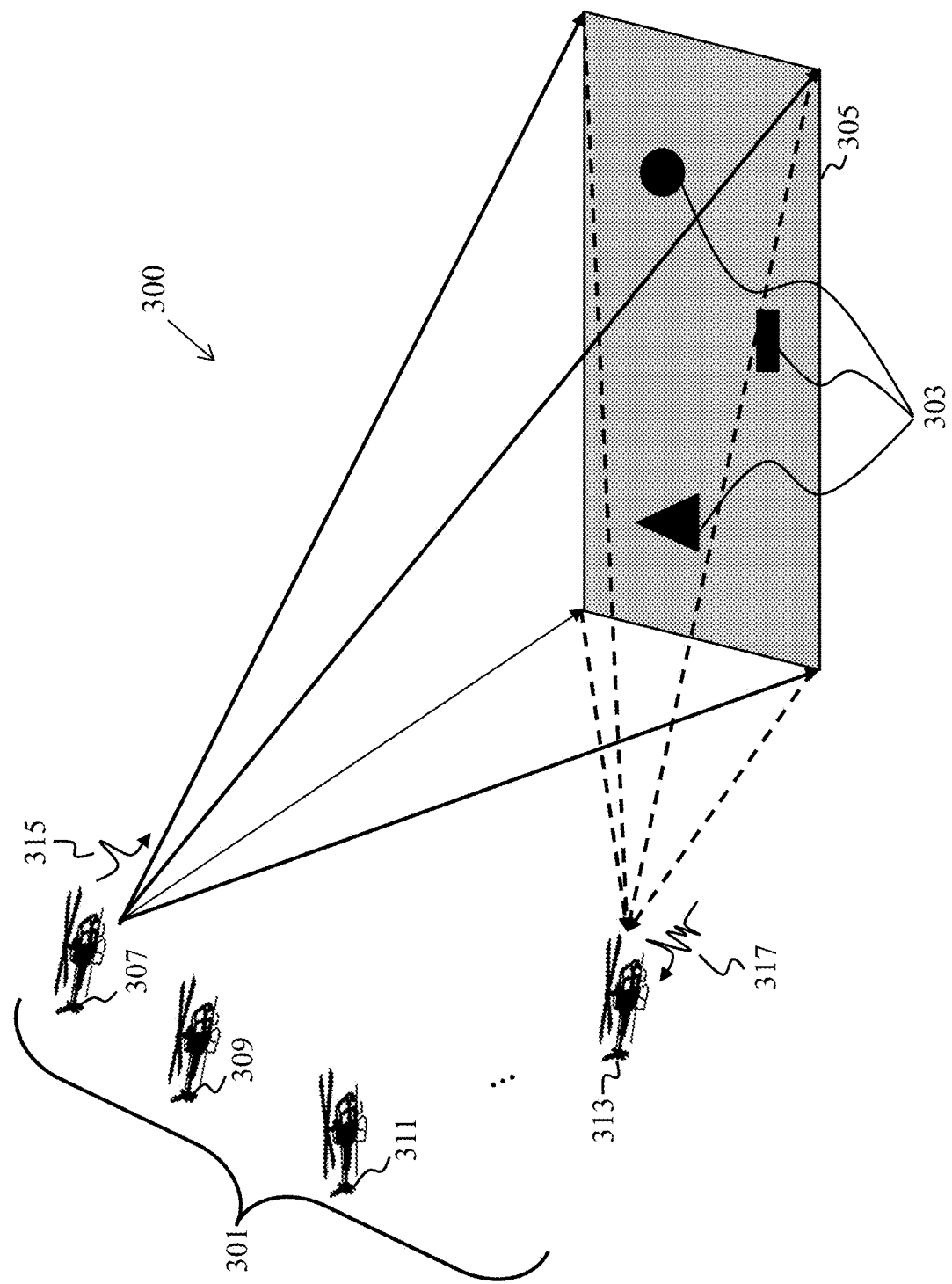
FIG. 3A illustrates an exemplary scenario of an uncontrolled environment having distributed arrays of moving radar platforms for determining images of targets in a region of interest (ROI), according to some embodiments of the present disclosure.

FIG. 3A illustrates an exemplary scenario of an uncontrolled environment having distributed arrays of moving radar platforms for determining images of targets in a region of interest (ROI), according to some embodiments of the present disclosure. As can be observed in FIG. 3A the uncontrolled environment 300 has distributed arrays of moving radar platforms 301 for determining images of targets 303 in a region of interest (ROI) 305, according to embodiments of the present disclosure. In particular, the system 100 that implements the method 200, can use an airborne platform or vehicle mounted platform that includes at least one moving transmit/receive platform or transmitter/receiver 307, and a set of M distributed moving similar receiver platforms or receivers 309, 311, 313. It is contemplated that the set of M distributed receivers may be five or more, 10 or more or 20 or more.

Radar pulses 315 are transmitted from at least one transmitter/receiver 307, to illuminate targets 303 situated in an area of interest or region of interest (ROI) 305, and the corresponding reflected radar reflections 317 are recorded by the multiple distributed receivers 307, 309, 311, and 313. The reflections 317 can be characterized as a weighted combination of delayed pulses, where complex weights depend on specific target reflectivities and antenna patterns. Given the pulses and reflections, radar images can be generated in a range-azimuth plane according to corresponding weights and delays. The azimuth resolution of the radar images depends on a size of an array aperture, and a range resolution depends on a bandwidth of the pulses.

A fundamental challenge that arises in the uncontrolled environment such as the distributed array imaging comes from uncertainty in the exact positions of the antennas (transmitters and receivers). While advanced positioning and navigation systems, such as the global positioning system/global navigation satellite system (GPS/GNSS) and the inertial navigation system (INS) provide somewhat accurate location information, the remaining uncertainty in the true antenna positions can span multiple wavelengths. As a result, the received signal, at one or more receivers, contains a gain and phase ambiguity (or errors) when the inaccurate positions of the one or more receiver antennas are used as reference. Consequently, applying standard reconstruction techniques without accounting for the position perturbation of the one or more receive antennas produces out-of-focus radar images. A framework to resolve the antenna position perturbation (or position ambiguity) is explained in detail with reference to FIGS. 3B-3E.

FIG. 3B and FIG. 3C in conjunction illustrate distortion that affects the measured time domain signal of each antenna due to the error in the antenna position, when measuring the reflection of a single target, according to example embodiments of the present disclosure. Further, FIG. 3B illustrates reflected pulses from the target 303 that are used by a set of antennas/receivers 307-313 having perturbed positions and measuring the reflection of a single target 303. FIG. 3C illustrates time-domain representation of the reflected pulses received by each of the receivers 307-313. Effect of the position perturbation on the aligning in time of the set of radar reflections can be observed in the FIG. 3C. The received pulses are shifted in time i.e. delayed versions of each other. This phenomenon occurs due to Doppler shift as there is a relative motion between at least one of the receivers 307-313 and the target 303.

Further, FIG. 3D is a schematic illustrating the mapping between a set of antennas having perturbed positions and measuring the reflection of a single target to a set of antennas having uniform linear positions and measuring shifted versions of the same target from FIG. 3B and FIG. 3C, according to embodiments of the present disclosure. Further, FIG. 3D is a schematic illustrating that the measured reflections of a single target at the perturbed antenna positions is equivalent to measuring shifted versions of the same target at the erroneous coarse positions of the set of receivers 307x, 309x, 311x, 313x, so as to later determine a set of image shifts for the set of receivers, where 317A, 319A, 321A, and 323A represent shifted target images.

Figure 3E:
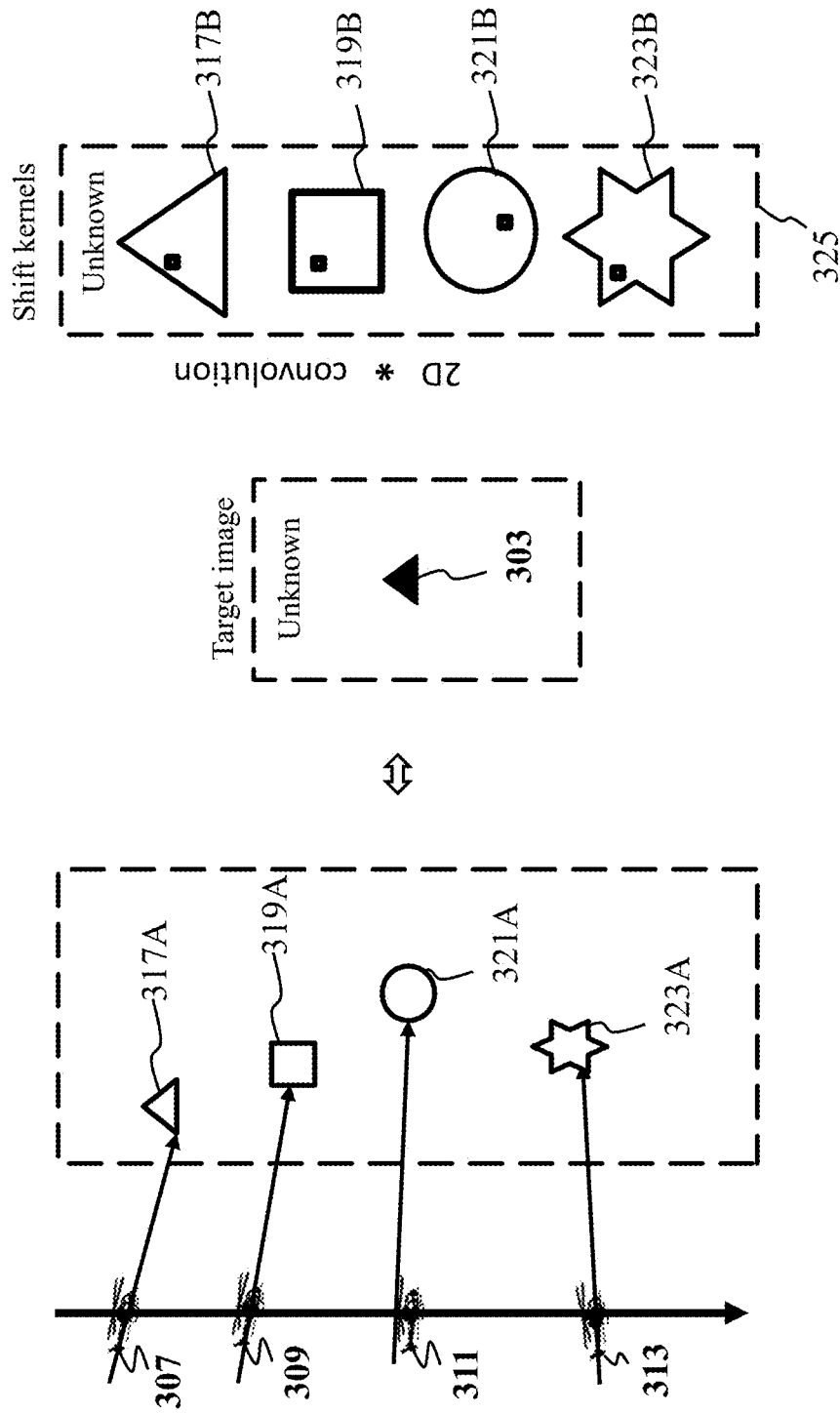
FIG. 3E is a schematic illustrating the relationship between the shifted target images and true target image convolved with a set of shift kernels, according to some embodiments of the present disclosure.

FIG. 3E is a schematic illustrating the relationship between the shifted target images 317A, 319A, 321A, 323A and true target image 303 convolved with a set of shift kernels 317 B, 319 B, 321 B, 323B, according to embodiments of the present disclosure. The measured reflections 307x, 309x, 311x, 313x in FIG. 3C correspond to measurements of a true target 303 by antennas located at coarse perturbed positions 307, 309, 311, 313 in FIG. 3B. These same measured reflections also correspond to radar reflections of shifted targets 317A, 319A, 321A, 323A by antennas located at erroneous coarse antenna positions 307x, 309x, 311x, 313x in FIG. 3D, which in turn are shown to be equivalent to reflections of the true target 303 that is convolved with image shifts 317 B, 319 B, 321 B, 323B formed by shift kernels 325 in FIG. 3E.

Regarding FIG. 3B, FIG. 3C, and FIG. 3D, at least one problem to solve during experimentation is recovering of the image x of the target 303 of FIG. 3A of a stationary scene 305 composed of sparse targets, and represented in vector form as $x \in C^N$. For example, the image is to be recovered by processing F—dimensional frequency-domain measurements $\{\tilde{y}_m\}_{m=1}^{M}$ 317 from M distributed antennas 301 that suffer from position ambiguity. The image acquisition setting estimator module 101 uses a framework illustrated in FIGS. 3B-3D, wherein a perturbation in the antenna positions results in a measured signal that corresponds to an image-domain convolution model as illustrated in FIG. 3E. Further, as described earlier due to the position ambiguity the received signal, at one or more receivers, contains the gain and phase errors. The gain and phase errors can produce the out-of-focus radar image of a target.

Figure 4A:
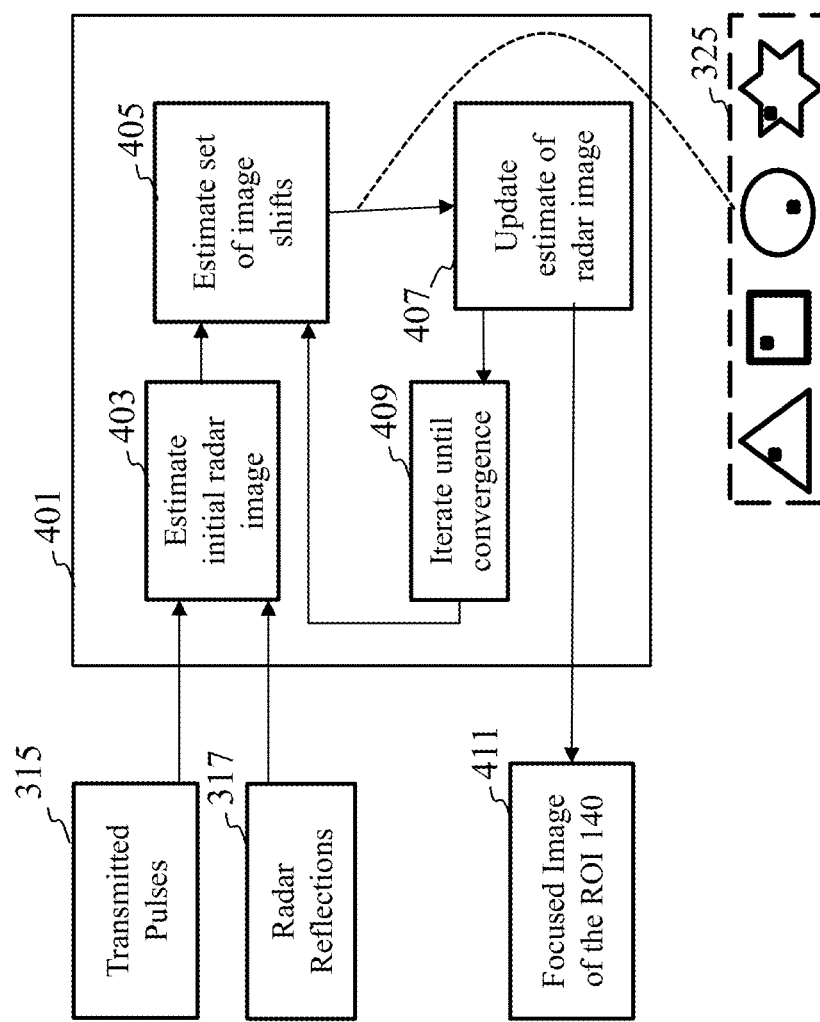
FIG. 4A illustrates a block diagram of a blind deconvolution method for estimating the radar image and the set of image shifts, according to some embodiments of the present disclosure.
Figure 4B:
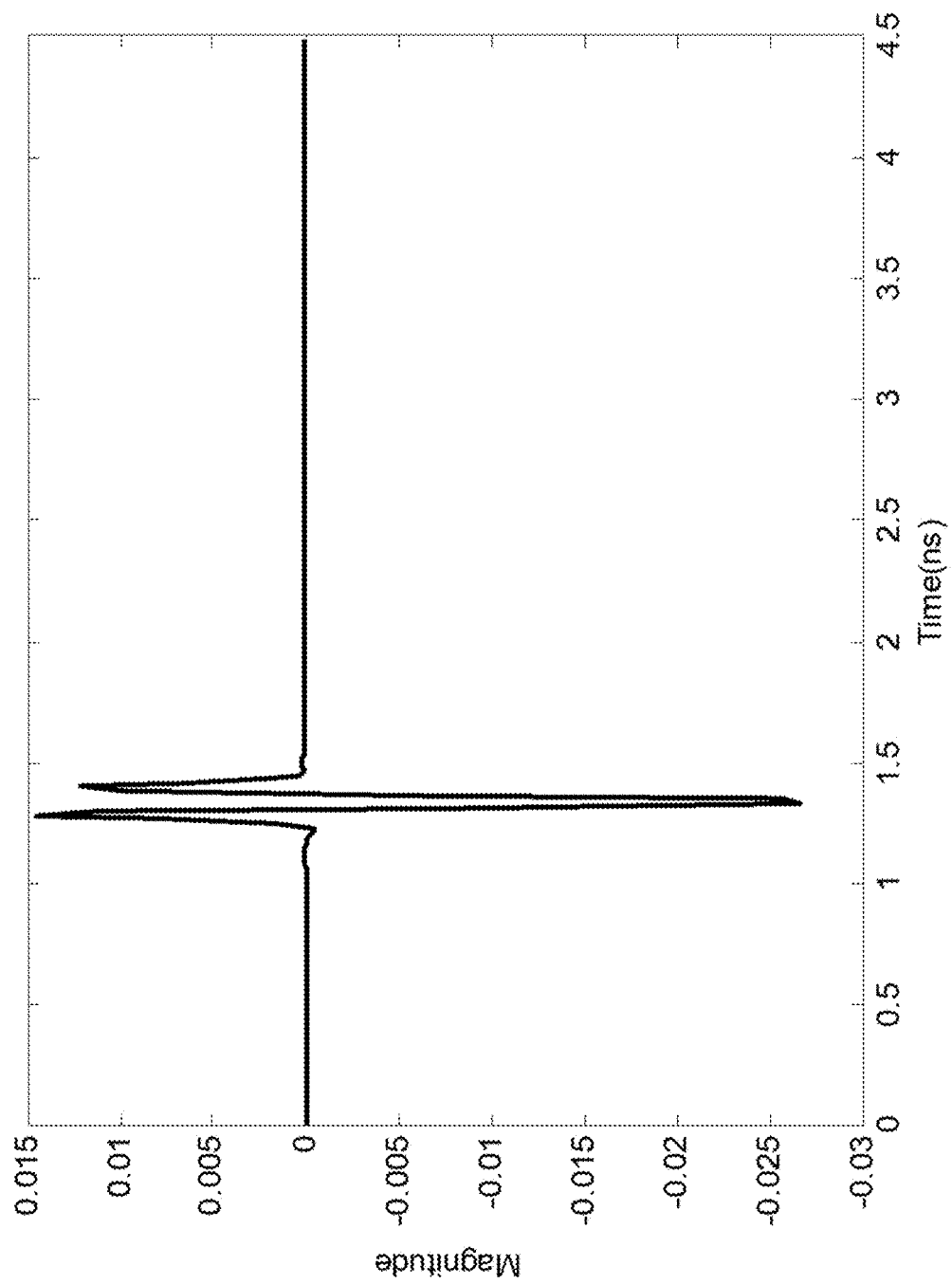
FIG. 4B illustrates an exemplary graph representing transmitted pulses.
Figure 4C:
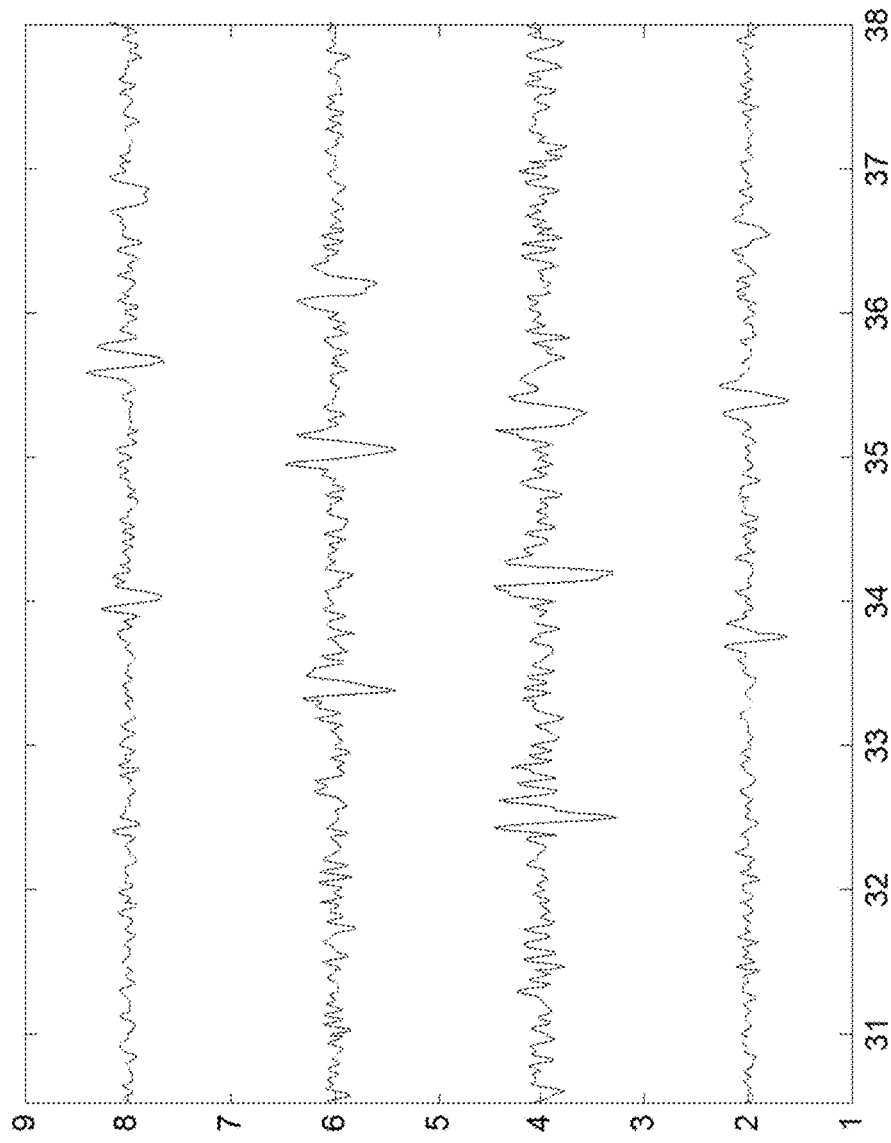
FIG. 4C illustrates an exemplary graph representing the radar reflections.

The problem of out-of-focus radar images can be resolved by resolving the gain and phase errors in the measured signal, which manifests as a blind deconvolution problem in the measurement domain. In an example embodiment, the image acquisition setting estimator module 101 may use a blind deconvolution method for estimation of the image x of target (or the radar image) and the set of image shifts. The blind deconvolution method is used to solve a blind deconvolution problem that is associated with a task of resolving gain and phase errors in the measured signal (for example, pulses reflected from at least one target in the ROI). The blind deconvolution method is described in detail with reference to FIGS. 4A-4C. FIG. 4A illustrates a block diagram of a blind deconvolution method for estimating the radar image and the set of image shifts according to the embodiments of the present disclosure. Further, FIG. 4B illustrates an exemplary graph representing transmitted pulses. FIG. 4C illustrates an exemplary graph representing the radar reflections.

Step 401 illustrates an iterative procedure for obtaining estimates for the radar image and estimate for the set of image shifts 317 B, 319 B, 321 B, 323B (as explained with reference to FIG. 3E). At step 403, estimating of an initial image, where the initial image is obtained by minimizing a difference between the radar reflections 317 and the modeled measurements produced by combining the transmitted pulses 315 and the erroneous antenna positions. For example, the initial radar image may be computed using initial antenna positions and by computing an update of the image that minimizes the difference between the measured data and the modeled data synthesized using the current estimates. The image is then filtered by applying the one-norm regularizer and the total variation regularizer and the process is repeated until convergence.

At step 405, estimating a set of image shifts 325 by minimizing a difference between the radar reflections and the modeled measurements synthesized from the transmitted pulses, initial image shifts, and estimate of radar image. For example, after the initial image is computed in step 403, the shift kernels 325 of FIG. 3E are updated by minimizing the difference between the radar reflections and the synthesized or modeled measurements. The computed image shifts 325 are then realigned according to the average assumed antenna position to produce the new estimate of images shifts.

At step 407, updating the estimate of the radar image by minimizing the difference between the radar reflections and the modeled measurements synthesized from the transmitted pulses, estimated image shifts, and estimate of radar image. At step 409, estimating a set of image shifts followed by updating the estimate of the radar image are repeated iteratively until the convergence criterion where the estimate of the radar image does not change is reached. At step 411, outputting the converged radar image of the region of interest (ROI).

Another fundamental challenge that arises in in the uncontrolled environment such as the distributed array imaging comes from uncertainty in the clock of the antennas. Advanced positioning and navigation systems, such as the global positioning system and the global navigation satellite system (GPS/GNSS) and the inertial navigation system (INS) provide somewhat accurate timing information, and timing and synchronization algorithms can further improve the accuracy with reasonable cost. However, the remaining uncertainty in the true clock error can be significant, compared to the operating frequency of the transmitting and receiving antennas. As a result, the received signal contains a gain and phase ambiguity when the inexact clock timing is used as a reference. Consequently, applying standard reconstruction techniques without accounting for the timing perturbation produces out-of-focus radar images.

To that end, the image acquisition setting estimator module 101 is configured to estimate a correction in the clock of at least one receiver (307, 309, 311, and 313) that collects radar measurements of a pulse that is transmitted from at least one transmitter and reflected from one or several targets in the scene or the region of interest (ROI) 305. Detailed explanation of estimation of the correction in the clock of the at least one receiver is given below with reference to FIGS. 5A-5C.

Figure 5A:
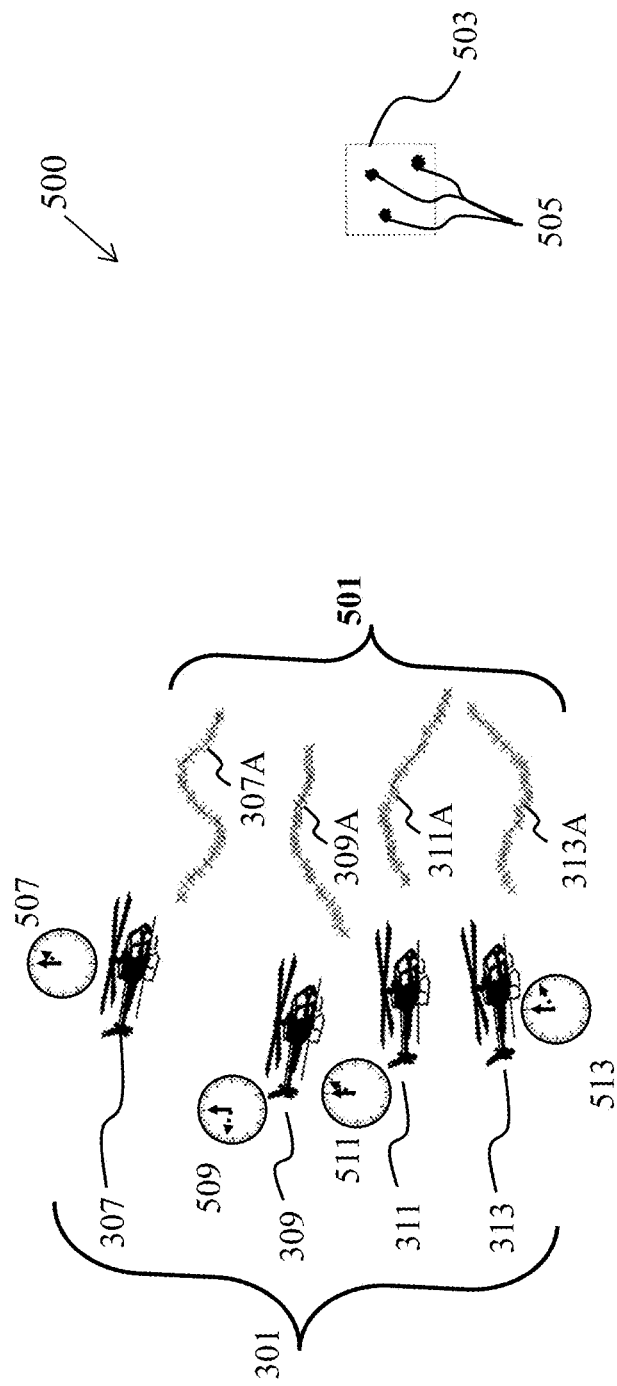
FIG. 5A is a schematic illustrating a time shift in a distributed moving radar imaging system, according to an example embodiment.

FIG. 5A is a schematic illustrating a time shift in a distributed moving radar imaging system, according to an example embodiment. As can be observed in the FIG. 5A, the moving radar imaging system 500 showing the radar pulses emitted toward the ROI, according to some embodiments. The radar receivers are receiving radar pulse reflections 307A, 309A, 311A, 313A that form the virtual array 501. The radar pulse reflections are from emitted radar pulses from a transmitter toward the scene 503 and reflected from the scene toward the receivers to form a virtual array 501 of receivers. The distributed arrays of moving radar platforms 301 includes at least one radar platform having an antenna cell which is connected to a radar transmitter 307 that generates the radar pulses toward the scene. As noted above, the radar transmitter 307 is combined with a receiver 307. The radar receivers 307, 309, 311, 313 acquire reflections reflected by targets 505 in the area of interest (ROI) of the scene 503.

In some embodiments, the radar receivers 307, 309, 311, 313 each have a local clock 507, 509, 511, 513, which may be fast or slow relative to a global clock. The local clocks are used to timestamp the received reflections. For example, in some embodiments, the time stamping might be using an absolute time. In some other embodiments, the time stamping could be relative to one or more commonly agreed start times, usually referred to as zero. In some other embodiments, time stamping might be implicit, for example by the sequence of recorded samples of the signal, at regular intervals, relative to the starting time of the recording.

Contrary to modeling the timing error as a phase error in the frequency domain and correcting it before reconstructing the radar image, the timing error is modeled as a convolution with a shift kernel representing the compensation, i.e., a signal which is one-sparse. A sparse signal is such that most of its coefficients are zero and very few are non-zero. A one-sparse signal, in particular, is such that only one of its coefficients is non-zero and all the remaining ones are equal to zero. A shift kernel is a one-sparse signal with the non-zero coefficient located at the time instance of the time delay or the advance that the kernel implements.

FIG. 5B and FIG. 5C in conjunction illustrate distortion that affects the measured time domain signal of each antenna due to the error in each radar clock, when measuring the reflection of a single target, according to an example embodiment. Further, FIG. 5B is schematic of the ideal case that all radar clocks are perfectly synchronized. A distributed array 301 is shown comprised of a transmitter/receiver platform 307 and receiver-only platforms 309, 311, 313. The transmitter antenna transmits a pulse 315 to the scene which contains a single reflective target 303. The pulse is reflected by the reflective target and its reflection 317 is acquired by all the receiving antennas in all the receiving platforms 307, 309, 311, 313. The antennas 307-313 form a distributed array of antennas 301. If the clocks of all transmitters and receivers are perfectly synchronized, according to the global time to, the signals 307, 309, 311, 313 received by each antenna 307, 309, 311, 313 comprise of the pulse delayed and scaled according to the round-trip distance of the transmitter antenna to the single reflector and back to each receiver.

FIG. 5C is a schematic illustrating the mapping between a set of antennas exhibiting clock errors and measuring the reflection of a single target to a set of antennas having synchronized clocks and measuring shifted versions of the same target from FIG. 5B, according to embodiments of the present disclosure. Further, FIG. 5C is a schematic of the signal model in the radar measurements where the measured reflections of a single target with erroneous clocks is equivalent to time-shifting measurements of the same target with clock synchronized to the global time.

FIG. 5C demonstrates the effect of clock errors in the acquired data, by showing how the signals are recorded and time stamped 307x, 309x, 311x, 313x, by the local time of each receiver. The local clocks of each system are 507, 509, 511, 513, where a solid line shows the local time, compared to the global time in a dashed line. In the example in the figure, some clocks might run slow, 507, 511, i.e., show time 0 when the global time is past zero, or fast 509, 513, i.e., show time 0 when global time has not reached zero yet. Depending on the time shift, the corresponding signals might be time shifted to appear earlier or later (solid lines) compared to how the signals would have been recorder if all the clocks have been synchronized (dotted lines).

In this example, the transmitter/receiver clock 507 runs slow. Thus, the transmitted pulse 315 is delayed by the clock error and its reflections arrive delayed to the receiver. The receiver antenna of the transmitter/receiver platform 507 exhibits the same clock error, which advances the signal in the local time t and, thus, cancels out the delay of the transmission for this recorder signal 307x. On the other hand, the clock 509 of receiver 309 runs fast in this example. Thus, the recorder signal 309x is delayed by the cumulative error of the two clocks, compared to the signal 309 that would have been recorded if all platforms were synchronized to the global clock. Similarly, the clock 511 of receiver 311 might run slow by an amount smaller that the error of the transmitter clock 507. Thus, the recorder signal 311x is delayed by the difference of the errors of the two clocks, compared to the signal 311 that would have been recorded if all platforms were synchronized to the global clock. Similarly, the clock 513 of receiver 313 might run fast by an amount larger than the error of the transmitter clock 507. Thus, the recorder signal 313x is advanced by the difference of error of the two clocks, compared to the signal 313 that would have been recorded if all platforms were synchronized to a global clock.

The image acquisition setting estimator module 101 converts finding a time shift of an unknown ideal signal to find a time shift of the radar measurements that would match an unknown ideal signal. Such problem transformation allows decoupling of the unknown time shift from the unknown scene that generates the unknown ideal signal, i.e., the unknown time shift and the unknown scene are on different sides of the equation. Thus, the image acquisition setting estimator module 101 finds a time shift of the radar measurements that would match an unknown ideal signal instead of finding a time shift of an unknown ideal signal to match the measurements.

The image acquisition setting estimator module 101 may be configured to recover a radar image of a scene/target including sparse targets, and represented in vector form as $x \in \mathbb{C}^n$. For example, the image is to be recovered by processing F-dimensional frequency-domain measurements $\{\tilde{y}_m\}_{m=1}^M$ from M distributed antennas 301 that suffer from clock errors. The image acquisition estimator module 101 may be configured to use an image reconstruction framework, wherein clock errors result in a time shift of the measured data that corresponds to a time-domain convolution model.

For example, for a transmitter-receiver pair in, if the transmitting antenna transmits pulse p(t) with respect to the global clock to the scene, then at the receiver antenna, the received data with respect to the global clock is equal to $$r_m(t) = \sum_{n=1}^{N} x_n p(t) * a_m^n(t) \tag{15}$$

where $x_n$ is the reflectivity of scene point n, $r_m(t)$ the received data with respect to the global clock, and $a_m^n(t)$ is the impulse response of the channel that describes the propagation of the reflected pulse from the transmitter to the scene point n and back to the receiver as a function of time t, for the transmitter/receiver pair in, and * denotes the convolution operation.

Given a relative clock delay of the transmitter relative to receiver cm, then the received signal in the receiver's local clock is equal to $$y_m(t) = r_m(t) * \delta(t - \epsilon_m) = \left(\sum_{n=1}^{N} x_n p(t) * a_m^n(t)\right) * \delta(t - \epsilon_m) \quad (16)$$

where $y_m(t)$ is the received signal in the receiver's local clock and $\delta(t-\epsilon_m)$ is an impulse delayed by cm.

This means that the received signal in the receiver's clock, when shifted by the reverse delay $-\epsilon_m$, would be equal to the signal that would have been received if the transmitter and the receiver were synchronized, i.e., $$y_m(t) * \delta(t + \epsilon_m) = r_m(t) = \sum_{n=1}^{N} x_n p(t) * a_m^n(t) \quad (17)$$

Fourier transform of the equation (17) can be represented as follows:

$$Y_m(\omega) e^{j\omega\epsilon_m} = R_m(\omega) = \sum_{n=1}^{N} P(\omega) A_m^n(\omega) x_n \quad (18)$$

where $Y_m(\omega)$, $R_m(\omega)$, $P(\omega)$ and $A_m^n(\omega)$ are Fourier transforms of $y_m(t)$, $r_m(t)$, $p(t)$ and $a_m^n(t)$, respectively, and co is a frequency in a frequency domain. The image acquisition setting estimator module 101 may use a discretized form of equation (18).

In particular, a discretized equivalent model is $r_m = A_m x$, where $r_m$ contains samples in frequency of $R_m(\omega)$, and the matrix $A_m$ incorporates, in frequency, the transmitted pulse $P(\omega)$ and the channel response $A_m^n(\omega)$. The matrix A is a forward operator defining the propagation of the pulse through the scene and back to the receivers. In other words, given in the image x of a scene, the product $A_m x$ generates a signal $r_m$, which is a propagation of the radar pulse through a radar propagation function of the scene.

Using $Z_m(\omega) = e^{j\omega\epsilon_m}$ to denote the advance $z(t) = \delta(t+\epsilon_m)$) in the frequency domain, the discretized data in the receiver's clock satisfy $D_{y_m} F_{z_m} = A_m x$, which is equivalent to $D_{y_m} F_{z_m} - A_m x = 0$, where, $y_m$ is the frequency-domain received data, $F_{z_m}$ is the impulse response of the time domain advance, F is a Fourier transform matrix, $F_{z_m}$ is a Fourier transform of $z_m$, i.e., the frequency-domain representation of the advance, $D_{y_m}$ is a diagonal operator with yin in the diagonal, and 0 is a vector with all zero coefficients. In other words, the discretization converts the element-wise multiplication to a multiplication of the diagonal matrix $D_{y_m}$ with the vector $F_{z_m}$, where $D_{y_m} F_{z_m}$ correspond to linear forward operator A.

Further, the image acquisition setting estimator module 101 is configured to use a fast iterative shrinkage thresholding (FISTA) algorithm to obtain the image x of the scene/target. FISTA iterates between computing a gradient step, thresholding using a shrinkage operator, projecting to a constraint set, updating a stepsize and updating a solution estimate according to the stepsize. After every iteration the error is reduced. The algorithm iterates until stopping criteria are satisfied, for example an error dropping below a maximum tolerable error, or an error stops improving in each iteration, or some pre-determined number of iterations is reached.

Figure 6A:
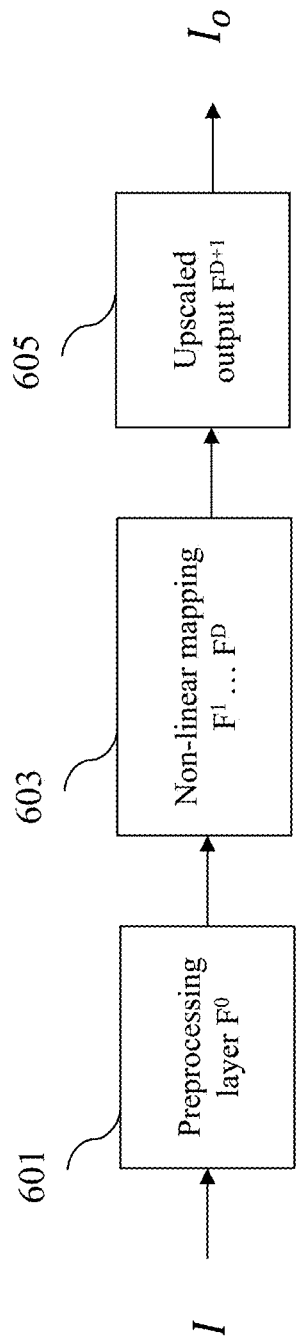
FIG. 6A illustrates a feed-forward network architecture used to implement FFDNet, according to an example embodiment.

Examples of the Denoiser Module:

In some example embodiments, the denoiser module 105 is implemented using FFDNet. FIG. 6A illustrates a standard feed-forward network architecture used to implement FFDNet, according to an example embodiment. The network is composed of D convolutional layers, which share the same structure. Each of these has W outputs, and the spatial size of their kernels is K×K. The FFDNet based denoiser receives as input a noisy image I, where the noisy image I may correspond to the noisy image z produced by the image acquisition inverter module 103. The output of the FFDNet denoiser is a denoiser image $I_0$.

At a preprocessing layer 601 the network first reorganizes the pixels of an $n_{ch} \times h \times w$ input image I into a lower resolution image of size $4n_{ch} \times h/2 \times w/2$. Layer $F^0$ extracts 2×2 patches and reorganizes their pixels in the different channels of the output image according to $$F^0[c, x, y] = I\left[\left[\frac{c}{4}\right], 2x + (c \bmod 2), 2y + \left[\frac{c}{4}\right]\right] \quad (19)$$

where $0 \le c \le 4n_{ch}$, $0 \le x \le h$, $0 \le y < w$. The majority of the processing will be performed at this reduced scale. An extra channel of the same resolution composed of an estimate of the noise map M is added to the input. This noise map controls the trade-off between denoising and detail preservation. For spatially invariant Gaussian noise with standard deviation a, the noise map is uniform with all its elements equal to $\sigma$.

A nonlinear mapping 603 is composed of D convolutional layers (layers $F^1 \ldots F^D$) comes after the preprocessing layer $F^0$. Each of these layers consists of W convolutional filters of spatial size K×K. The outputs of layers $F^1$ to $F^{D-1}$ are followed by point-wise ReLU activation functions ReLU(·)=max(·, 0). At training time, batch normalization layers (BN) are placed between the convolutional and ReLU layers in $F^2$ to $F^{-1}$. At evaluation time, the batch normalization layers are removed, and replaced by an affine layer that applies the learned normalization. Then, the c-th channel of the d-th layer, $F_c^d$ can be written as:

$$F_c^d = ReLU\left(\sum_{c'=0}^{D-1} w_{cc'}^d * F_{c'}^{d-1}\right) \text{ for } c \in \{0 \ldots W-1\}, \quad (20)$$

where $w_{cc'}^d$ is two-dimensional convolution kernel of size K×K (the c-th three-dimensional filter of layer $F^d$ is the collection of the W two-dimensional filters $w_{cc'}^d$). Summarizing the characteristics of the D layers of the nonlinear mapping as follows:

Layer $F^1$: Conv+ReLU. W filters of size $(4n_{ch}+1) \times K \times K$ generate W feature maps. A point-wise ReLU activation function is used as nonlinearity.

Layers $F^2 \ldots F^{D-1}$: Conv+BN+ReLU W filters of size W×K×K are used. At training time, batch normalization layers are placed between the convolutional and ReLU layers.

Layer $F^D$: Cony. $4n_{ch}$ filters of size W×K×K are used in this layer.

The input of each convolutional layer is zero-padded by (K−½) so that the spatial size does not decrease with depth. The stride is set to one in all cases.

Finally, at postprocessing layer 605, layer $F^{D+1}$ upsamples the low-resolution output of $F^D$ back into the original resolution. That is, it repacks its input of dimension $4n_{ch} \times h/2 \times w/2$ into an image of size $n_{ch} \times h \times w$ by reversing equation (20). The total number of layers is equal to D+2, where D is the number of convolutional layers. The spatial size of the convolutional kernels K is equal to 3. In one embodiment, FFDNet is used to implement the denoiser module 105 because in contrast to other existing neural network denoisers, FFDNet exhibits several desirable properties such as faster execution time and smaller memory footprint, and the ability to handle a wide range of noise levels with a single network model. The combination between its denoising performance and lower computational load makes it attractive for practical denoising applications.

In some example embodiments, the denoiser module 105 may be attached to a noise estimator module 107. FIG. 6A illustrates how a noisy input image can be used to determine the noise level map 606 using the noise estimator module 107. The noise level map 606 is also input to the denoising module 105 that has an FFDNet structure.

In some embodiments, the NLE module 107 is formed from two 2-D convolution layers 604 with 24 filters in each layer of size 3×3, and a ReLU activation function. The output of the NLE module 107 produces the noise standard deviation 606 that is input to the FFDNet denoiser 105.

Figure 6B:
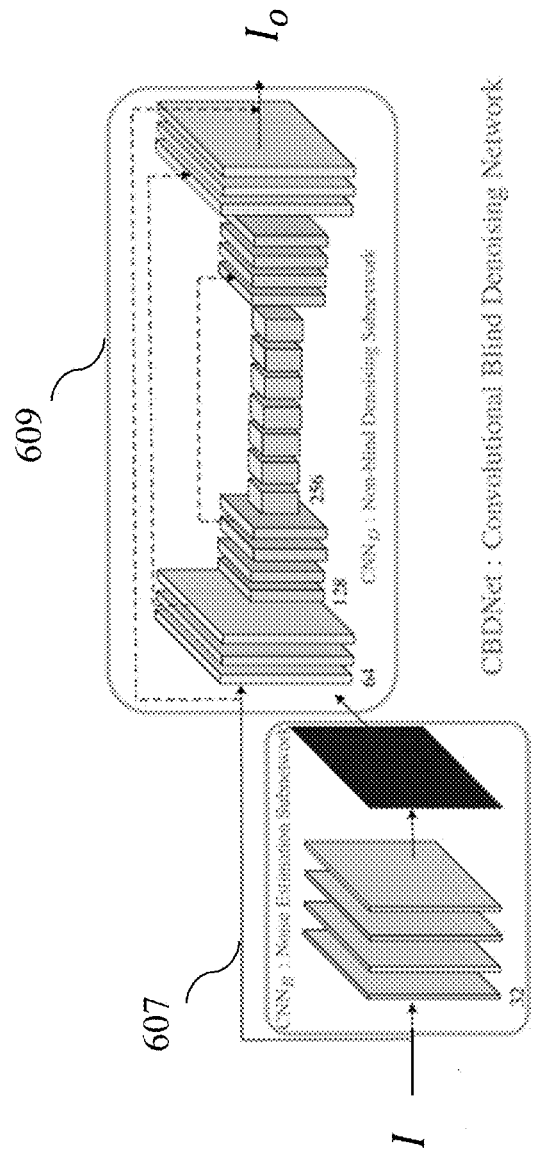
FIG. 6B illustrates a convolution blind denoising (CBD) network (CBDNet) implemented using the U-Net architecture, according to an example embodiment.

In some example embodiments, the denoiser module 105 may be implemented using U-Net architecture. FIG. 6B illustrates a convolution blind denoising (CBD) network (CBDNet) implemented using the U-Net architecture, according to an example embodiment. The CBDNet comprises a noise estimation sub network 607 ($CNN_E$) and the non-blind denoising sub network ($CNN_D$) 609. Both the sub networks 607, 609 are implemented using U-Net architecture as illustrated in the FIG. 6B. First, $CNN_E$ takes a noisy observation I to produce the estimated noise level map $\hat{\sigma}(I)=F_E(I; W_E)$, where $W_E$ denotes the network parameters of the $CNN_E$. The output of $CNN_E$ is the noise level map $\hat{\sigma}(I)$ that is of the same size as that of the input I and can be estimated with a fully convolutional network. Then, $CNN_D$ takes both I and $\hat{\sigma}(I)$ as input to obtain the final denoising result $\hat{x}=F_D(I, \hat{\sigma}(I); W_D)$, where $W_D$ denotes the network parameters of $CNN_D$. The $CNN_E$ allows for adjusting the estimated noise level map $\hat{\sigma}(I)$ before providing the input image I to the $CNN_D$. The $CNN_E$ is implemented with five-layer fully convolutional network without pooling and batch normalization operations. Further, ReLU nonlinearity is deployed after each convolutional layer. The $CNN_E$ is implemented using a 16-layer U-Net architecture as illustrated in FIG. 6B, where symmetric skip connections, strided convolutions and transpose convolutions are introduced for exploiting multi-scale information as well as enlarging receptive field. Further, the $CNN_D$ is implemented using the U-Net architecture which takes both I and $\hat{\sigma}(I)$ as input to give a prediction $I_0$ of the noise-free clean image.

Figure 6C:
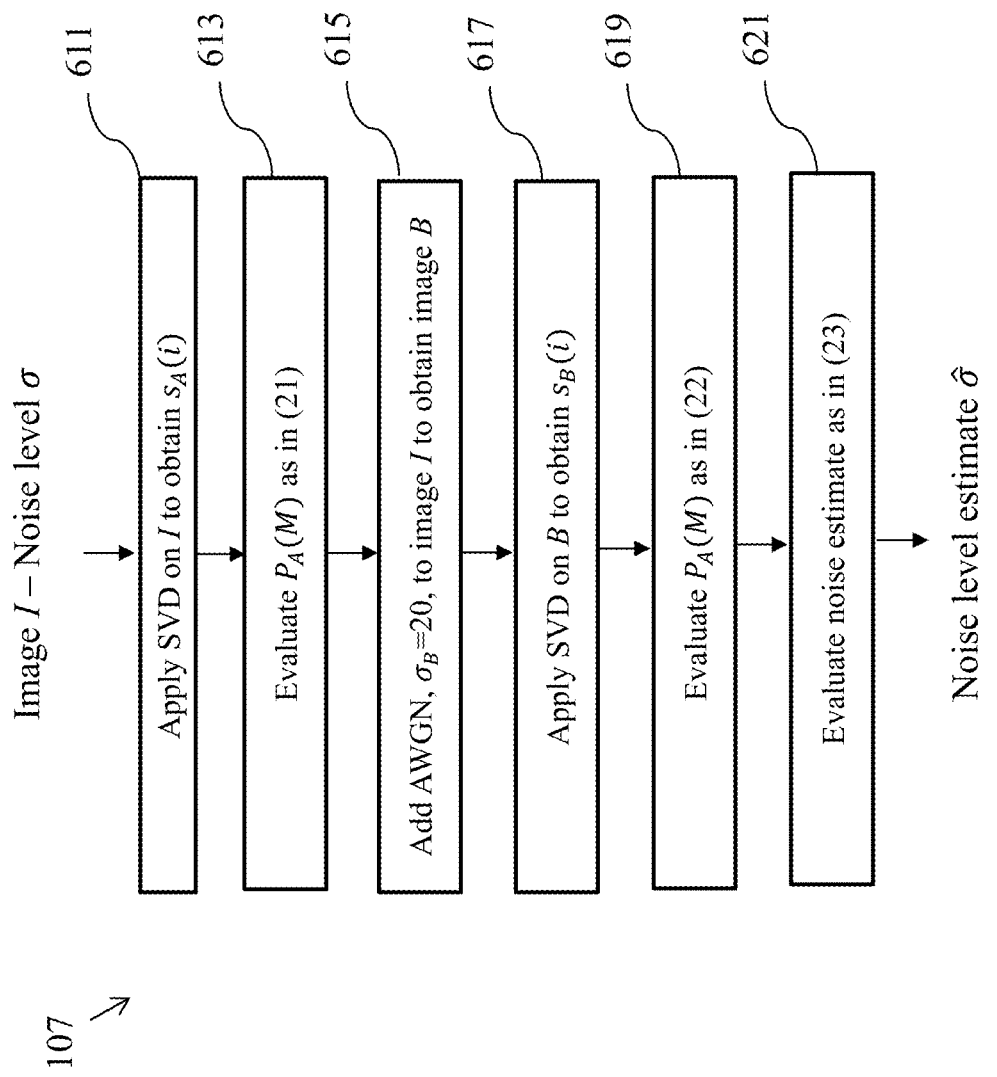
FIG. 6C illustrates implementation of the noise level estimator module 107 in a singular value decomposition (SVD) domain, according to an example embodiment.

In some example embodiments, the noise level estimator (NLE) module 107 may be implemented using a block-based noise level estimation algorithm. The algorithm relies on the artificial neural network (ANN) to perform a more complex signal analysis in a single value decomposition (SVD) domain. Further, the algorithm exhibits the capacity to adjust the effective singular value tail length with respect to the observed noise levels. FIG. 6C illustrates implementation of the noise level estimator module 107 in the singular value decomposition (SVD) domain, according to an example embodiment. As can be observed in the FIG. 6C, a noisy image I is given as input to the NLE module 107. The image I is corrupted by an unknown noise source σ.

At step 611, a singular value decomposition is performed on the input image to obtain a sequence of singular values, $s_A(i)$. At step 613, the average of M trailing singular values $P_A(M)$ is evaluated as $$P_A(M) = \frac{1}{M} \sum_{i=r-M+1}^{r} s_A(i) \quad (21)$$

In equation (21), M denotes the singular value tail length. For a reliable noise level estimation in the SVD domain, the singular value tail length is restricted to $M \in [0.25r, 0.8r]$, where r denotes the matrix rank. The recommended singular value tail length is M=0.75 r. At step 615, the input image I is further degraded by a known noise source, e.g., a zero mean additive white Gaussian noise with the standard deviation $\sigma_B=20$ to obtain a new image B. This image is processed in a similar manner as the input image I. At step 617, the singular value decomposition is performed on the image B to obtain a sequence of singular values $s_B(i)$. In the subsequent steps 619, 621 the average of M trailing singular values is evaluated as $$P_B(M) = \frac{1}{M} \sum_{i=r-M+1}^{r} s_B(i) \quad (22)$$

Finally, the noise level estimate $\hat{\sigma}$ for the entire image is evaluated as $$\hat{\sigma} = \frac{\alpha \sigma_B^2}{2(P_B(M) - P_A(M))} - \frac{P_B(M) - P_A(M)}{2\alpha} \quad (23)$$

where, parameter a defines the slope of a linear function that describes the distribution of average P(M) values across a range of noise levels.

Figure 6D:
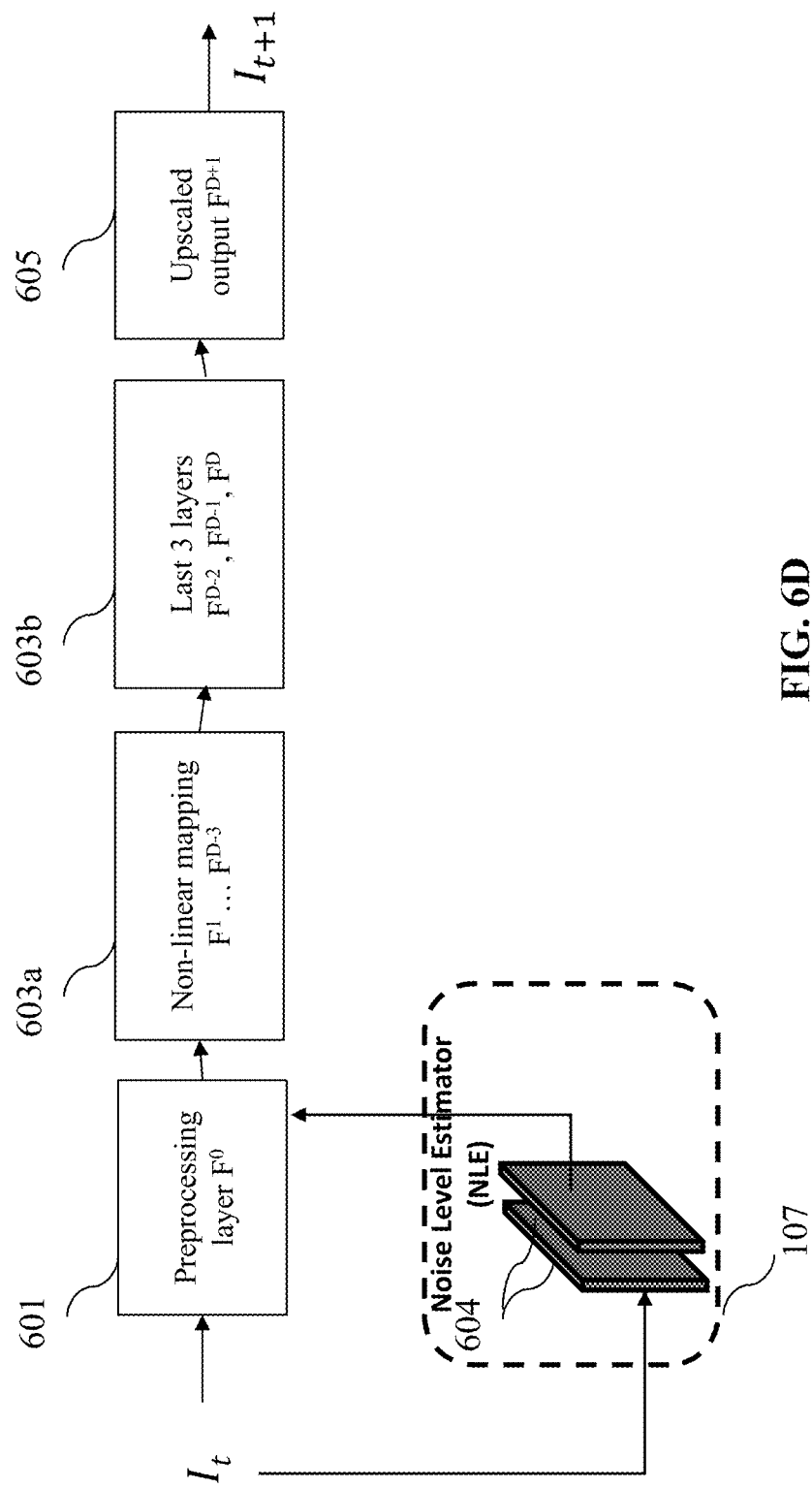
FIG. 6D shows an example of a fine-tuning training stage of the unfolded PQNM-PnP according to some embodiments.

Exemplar Training:

FIG. 6D shows an example of a fine-tuning training stage of the unfolded PQNM-PnP according to some embodiments. In one implementation, after the PQNM-PnP algorithm is unfolded over T iterations (for example T=10), the fine tuning at an iteration t of the NLE module 107 is trained such that only the NLE module 107 is updated as well as the last 3 layers 603b of the FFDNet denoiser module 105. The first D-3 layers 603a remain unchanged from the pretraining stage.

Figure 7:
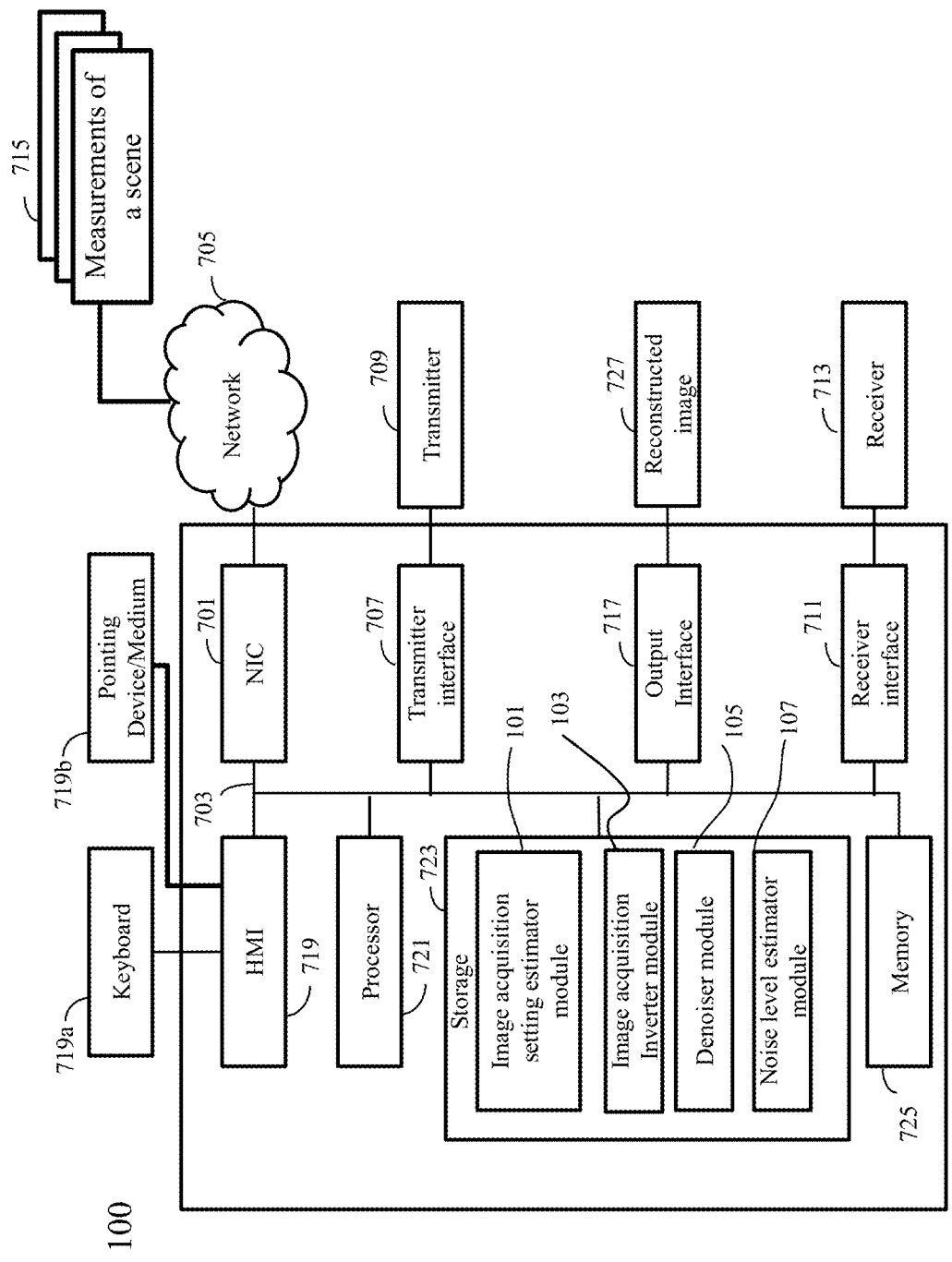
FIG. 7 illustrates a block diagram of the image processing system, according to some example embodiments.

Exemplar Implementation:

FIG. 7 illustrates a block diagram of the image processing system 100, in accordance with some embodiments. The image processing system 100 can have a number of interfaces connecting the system 100 with other systems and devices. A network interface controller 701 is adapted to connect the system 100 through the bus 703 to a network 705 connecting the image processing system 100 with sensing devices. For example, the radar system 100 includes a transmitter interface 707 configured to command to a transmitter 709 to emit a radar pulse. Using a receiver interface 711 connected to a receiver 713, the system 100 can receive the reflections of the scene corresponding to the transmitted pulse. In some implementations, the image processing system 100 receives measurements 715 of the image of the scene. In some embodiments the measurements may be radar measurements, which are the measurements of reflections of a radar pulse transmitted to the scene through the network 705 by the transmitter 709.

The image processing system 100 includes an output interface 717 configured to render the reconstructed image 727. For example, the output interface 717 can display the reconstructed image 727 on a display device, store the image 727 into storage medium and/or transmit the image 727 over the network 705. For example, the system 100 can be linked through the bus 703 to a display interface adapted to connect the system 100 to a display device, such as a computer monitor, camera, television, projector, or mobile device, among others. The system 100 can also be connected to an application interface adapted to connect the system 100 to equipment for performing various tasks.

In some implementations, the image processing system 100 includes an input interface to receive the measurements of the image of the scene collected from a set of antennas with timing ambiguities or position ambiguities. Examples of the input interface include a network interface controller (NIC) 701, the receiver interface 711, and a human machine interface 719. The human machine interface 719 within the system 100 connects the system to a keyboard 719a and pointing device 719b, wherein the pointing device 719b can include a mouse, trackball, touchpad, joy stick, pointing stick, stylus, or touchscreen, among others.

The system 100 includes a processor 721 configured to execute stored instructions 723, as well as a memory 725 that stores instructions that are executable by the processor 721. The processor 721 can be a single core processor, a multi-core processor, a computing cluster, or any number of other configurations. The memory 725 can include random access memory (RAM), read only memory (ROM), flash memory, or any other suitable memory systems. The processor 721 can be connected through the bus 703 to one or more input and/or output (I/O) devices.

The instructions can implement a method for determining or reconstructing the image of the scene by solving the linear inverse problem. To that end, the instructions include the image acquisition settings estimator module 101 configured to estimate a forward operator of the image acquisition settings based on settings data. The image acquisition inverter module 103 configured to invert the effect of the estimated forward operator on the measurements of the image, and further, to modify a previous estimate of the image of the scene to fit the measurements inverted with the forward operator to produce a current noisy image of the scene. The denoiser module 105 configured to remove a noise from a noisy image provided to the denoiser subject to a known noise level. The noise level estimator module 107 configured to estimate a noise level in an input image provided to the noise level estimator.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of our present disclosure include coherent distributed radar imaging by allowing location ambiguities, and on autofocusing for a single sensor array by distributed sensing with multiple sensors. In particular, a multi-static radar imaging approach where one transmitting/receiving radar platform and multiple receiving radar platforms are moving towards a region of interest (ROI) with position perturbations. The embodiments of our present disclosure detect targets inside the ROI. Due to inaccurate positioning and motion errors, the actual array positions are perturbed up to several times a central radar wavelength. Although the image resolution of each sensor array may be low due to its small aperture size, a high-resolution image can be formed by jointly processing the outputs of all distributed arrays with well-compensated position errors. The embodiments of our present disclosure assume a sparse scene, and is realized iteratively by solving series of optimization problems for compensating position-induced phase errors, exploiting target signatures, and estimating antenna positions.

The embodiments of our present disclosure also provide for auto-focus radar imaging for generating a radar image of targets situated in an area of interest using a single moving transmit radar platform or combination transmitter/receiver along with multiple spatially distributed moving radar receiver platforms or receivers. The moving radar receivers are perturbed with unknown position errors up to several radar wavelengths.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed:

1. An image processing system for determining an image of a scene, comprising:
    an input interface configured to accept measurements of the scene acquired under image acquisition settings and settings data indicative of the image acquisition settings;
    a memory configured to store instructions implementing modules of the system, the modules comprising:
        an image acquisition settings estimator module configured to estimate a forward operator of the image acquisition settings based on the settings data;
        an image acquisition inverter module configured to modify a previous estimate of the image of the scene to fit the measurements inverted with the forward operator to produce a current noisy image of the scene;
        a denoiser module configured to remove noise from a noisy image provided to the denoiser module subject to a known noise level;
        a noise level estimator module configured to estimate a noise level in an input image provided to the noise level estimator module;
    a processor coupled with the memory and configured to execute the image acquisition settings estimator module to estimate the forward operator using the setting data; and
        recursively estimate the image of the scene until a termination condition is met, wherein for a current iteration, the processor (1) executes the image acquisition inverter module with the estimated forward operator and the previous estimate of the image of the scene estimated during a previous iteration to produce the current noisy image; (2) executes the noise level estimator module with the previous estimate of the image to produce a current noise level; and (3) executes the denoiser to remove the current noise level from the current noisy image to produce a current image; and
    an output interface configured to output the image of the scene.

2. The image processing system of claim 1, wherein the image acquisition inverter module is a solver configured to: modify the previous estimate of the image of the scene by adding a scaled gradient update of a distance function.

3. The image processing system of claim 2, wherein the distance function quantifies error between the measurements of the image and synthesized measurements of the image.

4. The image processing system of claim 3, wherein the synthesized measurements are obtained by multiplying the forward operator and the previous estimate of the scene.

5. The image processing system of claim 1, wherein the image acquisition settings estimator module is further configured to estimate a blur kernel resulting from an out of focus acquisition or a motion of a camera that acquires the image of the scene.

6. The image processing system of claim 1, wherein the image acquisition settings estimator module is in communication with a set of transmitters and a set of receivers.

7. The image processing system of claim 6, wherein the image acquisition settings estimator module is configured to estimate a correction of a position of at least one receiver, from the set of receivers, that collects measurements of a pulse that is transmitted from at least one transmitter, of the set of transmitters, and reflected from one or several targets in the scene.

8. The image processing system of claim 6, wherein the image acquisition settings estimator module is further configured to estimate a correction of a timing of a reference illuminating pulse that is transmitted from at least one transmitter of the set of transmitters, and that is received by at least one receiver that is not synchronized with the transmitter.

9. The image processing system of claim 1, wherein the denoiser module is at least one of an FFDNet neural network or a U-Net neural network.

10. The image processing system of claim 9, wherein the denoiser module is trained on noisy images with different levels of noise.

11. The image processing system of claim 1, wherein the noise level estimator module is a convolutional neural network trained with the pretrained denoiser module.

12. A method for determining an image of a scene, wherein the method uses a processor coupled with stored instructions implementing the method, wherein the instructions, when executed by the processor carry out steps of the method, comprising:
    accepting, by an input interface, measurements of the image of the scene acquired under image acquisition settings, and settings data indicative of the image acquisition settings;
    estimating, by an image acquisition setting estimator module, forward operator of the image acquisition settings based on the settings data;
    modifying, by the image acquisition inverter module, a previous estimate of the image of the scene to fit the measurements inverted with the estimated forward operator to produce a current noisy image of the scene;
    removing, by the denoiser module, noise from a noisy image provided to the denoiser module subject to a known noise level;

estimating, by the noise level estimator (NLE) module, noise level present in an input image provided to the NLE module;

recursively estimating the image of the scene until a termination condition is met, wherein for a current iteration: (1) executing the image acquisition inverter module with the estimated forward operator and the previous estimate of the image of the scene estimated during a previous iteration to produce the current noisy image (2) executing the noise level estimator module with the previous estimate of the image to produce a current noise level; and (3) executing the denoiser to remove the current noise level from the current noisy image to produce a current image; and outputting, by an output interface, the image of the scene.

13. The method of claim 12, wherein modifying the previous estimate of the image of the scene comprises modifying the previous estimate of the image by adding a scaled gradient update of a distance function.

14. The method of claim 13, wherein the distance function quantifies error between the measurements of the image and synthesized measurements of the image.

15. The method of claim 14, wherein the synthesized measurements are obtained by multiplying the forward operator and the previous estimate of the scene.

* * * * *